United States Patent
Ramprashad et al.

(10) Patent No.: US 8,542,640 B2
(45) Date of Patent: Sep. 24, 2013

(54) INTER-CELL APPROACH TO OPERATING WIRELESS BEAM-FORMING AND USER SELECTION/SCHEDULING IN MULTI-CELL ENVIRONMENTS BASED ON LIMITED SIGNALING BETWEEN PATTERNS OF SUBSETS OF CELLS

(75) Inventors: Sean A. Ramprashad, Los Altos, CA (US); Xiaojun Tang, North Brunswick, NJ (US); Haralabos C. Papadopoulos, San Jose, CA (US)

(73) Assignee: NTT DoCoMo, Inc., Tokyo (JP)

( * ) Notice: Subject to any disclaimer, the term of this patent is extended or adjusted under 35 U.S.C. 154(b) by 811 days.

(21) Appl. No.: 12/546,471

(22) Filed: Aug. 24, 2009

(65) Prior Publication Data
US 2010/0056171 A1    Mar. 4, 2010

Related U.S. Application Data

(60) Provisional application No. 61/092,722, filed on Aug. 28, 2008.

(51) Int. Cl.
*H04W 4/00*    (2009.01)

(52) U.S. Cl.
USPC .......................................... 370/329; 379/341

(58) Field of Classification Search
USPC ................. 370/329, 310, 315, 328, 330, 335, 370/336, 341, 342, 343, 344, 345, 347
See application file for complete search history.

(56) References Cited

U.S. PATENT DOCUMENTS

| | | | |
|---|---|---|---|
| 5,903,842 A | 5/1999 | Wang et al. | |
| 5,982,327 A | 11/1999 | Vook et al. | |
| 6,182,264 B1 | 1/2001 | Ott | |
| 6,629,287 B1 | 9/2003 | Brink | |
| 6,804,307 B1 | 10/2004 | Popović | |
| 6,862,552 B2 | 3/2005 | Goldstein et al. | |
| 6,901,117 B1 | 5/2005 | Classon et al. | |

(Continued)

FOREIGN PATENT DOCUMENTS

| EP | 1162750 A2 | 12/2001 |
|---|---|---|
| EP | 1383246 A2 | 1/2004 |

(Continued)

OTHER PUBLICATIONS

US Final Office Action for U.S. Appl. No. 11/873,248, dated Sep. 1, 2010, 21 pages.

(Continued)

*Primary Examiner* — Dady Chery
(74) *Attorney, Agent, or Firm* — Blakey, Sokoloff, Taylor & Zafman LLP

(57) ABSTRACT

Methods, architectures and techniques of operating a joint beam-forming and user-selection system across multiple cells for downlink communication in a multi-cell environment. The system coordinates beamforming vector and user selection across multiple cells, but is cellular in the sense that users are served only from the transmission signals originating from one cell. There is provided methods, architectures and techniques to control the level and effect of inter-cell interference through a partially coordinated multi-cell process of user scheduling and beam selection based on the division of cells into different subsets. Multi-step techniques are utilized that can scale to large numbers of cells, specifying which operations remain as independent operations within a cell, and which operations, with what cells, require information exchange.

22 Claims, 6 Drawing Sheets

(56) References Cited

U.S. PATENT DOCUMENTS

| | | | |
|---|---|---|---|
| 6,976,087 B1 | 12/2005 | Westfall et al. | |
| 7,042,856 B2 * | 5/2006 | Walton et al. | 370/329 |
| 7,072,295 B1 | 7/2006 | Benson et al. | |
| 7,095,812 B2 | 8/2006 | Chan et al. | |
| 7,251,369 B2 | 7/2007 | Nakaya | |
| 7,308,047 B2 | 12/2007 | Sadowsky | |
| 7,310,369 B1 | 12/2007 | Krieger et al. | |
| 7,436,895 B1 | 10/2008 | Tujkovic | |
| 7,441,045 B2 | 10/2008 | Skene et al. | |
| 7,443,925 B2 | 10/2008 | Mehta et al. | |
| 7,877,097 B2 | 1/2011 | Zhu et al. | |
| 7,877,108 B2 | 1/2011 | Wengerter et al. | |
| 8,027,407 B2 | 9/2011 | Papadopoulos | |
| 8,042,031 B2 | 10/2011 | Chen et al. | |
| 2002/0114404 A1 | 8/2002 | Aizawa et al. | |
| 2002/0118781 A1 | 8/2002 | Thomas et al. | |
| 2002/0176431 A1 | 11/2002 | Golla et al. | |
| 2003/0002505 A1 | 1/2003 | Hoch et al. | |
| 2003/0072254 A1 | 4/2003 | Ma et al. | |
| 2003/0235149 A1 | 12/2003 | Chan et al. | |
| 2003/0236080 A1 | 12/2003 | Kadous et al. | |
| 2004/0013180 A1 | 1/2004 | Giannakis et al. | |
| 2004/0022179 A1 | 2/2004 | Giannakis et al. | |
| 2004/0042400 A1 | 3/2004 | Horlin et al. | |
| 2004/0116146 A1 | 6/2004 | Sadowsky et al. | |
| 2004/0165675 A1 | 8/2004 | Ito et al. | |
| 2004/0205445 A1 | 10/2004 | Xu | |
| 2005/0010675 A1 | 1/2005 | Jaggi | |
| 2005/0041751 A1 | 2/2005 | Nir et al. | |
| 2005/0047514 A1 | 3/2005 | Bolinth et al. | |
| 2005/0068918 A1 | 3/2005 | Mantravadi et al. | |
| 2005/0111592 A1 | 5/2005 | Yee | |
| 2005/0152391 A1 | 7/2005 | Effros et al. | |
| 2005/0185707 A1 | 8/2005 | Hoo et al. | |
| 2005/0220040 A1 | 10/2005 | Petrovic et al. | |
| 2005/0265280 A1 | 12/2005 | Roh et al. | |
| 2006/0002312 A1 | 1/2006 | Delattre et al. | |
| 2006/0020560 A1 | 1/2006 | Rodriguez et al. | |
| 2006/0029124 A1 | 2/2006 | Grant et al. | |
| 2006/0039489 A1 | 2/2006 | Ikram et al. | |
| 2006/0098760 A1 | 5/2006 | Shen et al. | |
| 2006/0146716 A1 | 7/2006 | Lun et al. | |
| 2006/0146791 A1 | 7/2006 | Deb | |
| 2006/0148506 A1 | 7/2006 | Hoo | |
| 2006/0152391 A1 | 7/2006 | Sakuyama | |
| 2006/0176945 A1 | 8/2006 | Li | |
| 2006/0276217 A1 | 12/2006 | Khojastepour et al. | |
| 2007/0041475 A1 | 2/2007 | Koshy et al. | |
| 2007/0066229 A1 | 3/2007 | Zhang et al. | |
| 2007/0121499 A1 | 5/2007 | Pal et al. | |
| 2007/0156919 A1 | 7/2007 | Potti et al. | |
| 2007/0198899 A1 | 8/2007 | Yellin et al. | |
| 2007/0213013 A1 | 9/2007 | Kim | |
| 2007/0223423 A1 | 9/2007 | Kim et al. | |
| 2007/0281633 A1 | 12/2007 | Papadopoulos | |
| 2007/0286313 A1 | 12/2007 | Nikopour-Deilami et al. | |
| 2008/0025430 A1 | 1/2008 | Sadowsky | |
| 2008/0032630 A1 | 2/2008 | Kim et al. | |
| 2008/0075022 A1 | 3/2008 | Lei et al. | |
| 2008/0092028 A1 | 4/2008 | Orio | |
| 2008/0101310 A1 | 5/2008 | Marzetta | |
| 2008/0123781 A1 | 5/2008 | Pisek et al. | |
| 2008/0181339 A1 | 7/2008 | Chen et al. | |
| 2008/0212526 A1 | 9/2008 | Oyman | |
| 2009/0082054 A1 | 3/2009 | Li et al. | |
| 2009/0213954 A1 | 8/2009 | Bursalioglu et al. | |
| 2009/0225878 A1 | 9/2009 | Papadopoulos et al. | |
| 2009/0268684 A1 * | 10/2009 | Lott et al. | 370/329 |
| 2009/0285323 A1 | 11/2009 | Sundberg et al. | |
| 2009/0291699 A1 | 11/2009 | Heath et al. | |
| 2009/0296842 A1 | 12/2009 | Papadopoulos et al. | |

FOREIGN PATENT DOCUMENTS

| | | | |
|---|---|---|---|
| EP | 1411693 A2 | 4/2004 | |
| EP | 1521386 A2 | 4/2005 | |
| EP | 1530387 A1 | 5/2005 | |
| EP | 1648097 A | 4/2006 | |
| EP | 1648097 A2 | 4/2006 | |
| EP | 1827040 A1 | 8/2007 | |
| EP | 1863208 A1 | 12/2007 | |
| GB | 2304495 | 3/1997 | |
| GB | 2407007 A | 4/2005 | |
| WO | WO 01/43293 A1 | 6/2001 | |
| WO | WO 2004/045167 A | 5/2004 | |
| WO | WO 2004/025011 A | 7/2004 | |
| WO | WO 2005/046081 A1 | 5/2005 | |
| WO | WO 2006/029050 A | 3/2006 | |
| WO | WO 2007/050860 A1 | 5/2007 | |
| WO | WO 2007/073267 A1 | 6/2007 | |
| WO | WO 2004/056011 A1 | 7/2007 | |
| WO | WO 2007/087540 A2 | 8/2007 | |
| WO | WO 2007/129990 A1 | 11/2007 | |
| WO | WO 2008/057791 A1 | 5/2008 | |
| WO | WO 2008/143973 A1 | 11/2008 | |
| WO | WO 2009/033023 A2 | 3/2009 | |
| WO | WO 2010/019618 A2 | 2/2010 | |

OTHER PUBLICATIONS

US Office Action for U.S. Appl. No. 11/939,353 dated Jan. 31, 2011, 15 pages.
PCT International Preliminary Report on Patentability for PCT Patent Application No. PCT/US2009/046014, dated Dec. 16, 2010, 9 pages.
PCT International Search Report for PCT Patent Application No. PCT/US2010/033549, Jan. 5, 2011, 5 pgs.
PCT Written Opinion of the International Searching Authority for PCT Patent Application No. PCT/US2010/033549, Jan. 5, 2011, 6 pgs.
European Office Action for European Patent Application No. 08767750.6, dated Jan. 12, 2011, 6 pgs.
PCT International Search Report for PCT Patent Application No. PCT/US2010/027139, Dec. 6, 2010, 5 pgs.
PCT Written Opinion of the International Searching Authority for PCT Patent Application No. PCT/US2010/027139, Dec. 6, 2011, 6 pgs.
European Office Action for European Patent Application No. 08767751.4, Jan. 14, 2011, 5 pgs.
US Office Action for U.S. Appl. No. 11/644,638, dated Sep. 22, 2009, 13 pages.
PCT International Preliminary Report on Patentability for PCT Patent Application No. PCT/US2007/013074, dated Dec. 30, 2009, 8 pages.
PCT International Search Report for PCT Patent Application No. PCT/US2008/006287, dated Oct. 2, 2008, 6 pgs.
Written Opinion of the International Searching Authority for PCT Patent Application No. PCT/US2008/006287, dated Oct. 2, 2008, 7 pgs.
PCT International Preliminary Report on Patentability for PCT Patent Application No. PCT/US2008/065675, dated Dec. 17, 2009, 8 pages.
PCT International Search Report for PCT Patent Application No. PCT/US2009/054937, dated Dec. 30, 2009, 7 pgs.
Written Opinion of the International Searching Authority for PCT Patent Application No. PCT/US2009/054937, dated Dec. 30, 2009, 7 pgs.
Robertson, Patrick, et al., "A Comparison of Optimal and Sub-Optimal MAP Decoding Algorithms Operating in the Log Domain", Proceedings of the International Conference on Communications, Jun. 18, 1995, pp. 1009-1013, vol. 2, IEEE, New York, USA.
PCT International Search Report for PCT Patent Application No. PCT/US2009/56865, dated Mar. 2, 2010, 7 pgs.
Written Opinion of the International Searching Authority for PCT Patent Application No. PCT/US2009/56865, dated Mar. 2, 2010, 12 pgs.
PCT International Search Report for PCT Patent Application No. PCT/US2009/034758, dated Feb. 4, 2010, 7 pgs.
Written Opinion of the International Searching Authority for PCT Patent Application No. PCT/US2009/034758, dated Feb. 4, 2010, 7 pgs.

Sun, Sumei, et al., "Pseudo-Inverse MMSE Based QRD-M Algorithm for MIMO OFDM", Jan. 1, 2006, pp. 1545-1549, vol. 3.

Dai, Yongmei, et al., "A Comparative Study of QRD-M Detection and Sphere Decoding for MIMI-OFDM Systems", 2005 IEEE 16th International Symposium on Personal, Indoor and Mobile Radio Communications, Jan. 1, 2005, pp. 186-190.

US Office Action for U.S. Appl. No. 12/538,733, Oct. 18, 2011, 11 pgs.

US Office Action for U.S. Appl. No. 12/538,739, Dec. 7, 2011, 23 pgs.

US Final Office Action for U.S. Appl. No. 12/538,733, Mar. 27, 2012, 6 pgs.

US Final Office Action for U.S. Appl. No. 12/335,409, Mar. 19, 2012, 22 pgs.

US Office Action for U.S. Appl. No. 12/335,389, Apr. 12, 2012, 20 pgs.

PCT International Preliminary Report on Patentability for PCT Patent Application No. PCT/US2010/033549, Nov. 17, 2011, 7 pgs.

US Notice of Allowance for U.S. Appl. No. 11/754,903, Mar. 12, 2012, 8 pgs.

Papadogiannis, et al., "A Dynamic Clustering Approach in Wireless Networks with Multi-Cell Cooperative Processing", IEEE International Conference on Communications, May 19, 2008, pp. 4033-4037.

PCT International Preliminary Report on Patentability for PCT Patent Application No. PCT/US2009/053466, dated Feb. 24, 2011, 9 pages.

PCT International Preliminary Report on Patentability for PCT Patent Application No. PCT/US2009/053471, dated Feb. 24, 2011, 9 pages.

PCT International Preliminary Report on Patentability for PCT Patent Application No. PCT/US2009/054937, dated Mar. 10, 2011, 8 pages.

PCT International Preliminary Report on Patentability for PCT Patent Application No. PCT/US2009/056865, dated Mar. 24, 2011, 12 pgs.

European Office Action for European Patent Application No. 07862325.3, Apr. 7, 2011, 6 pgs.

US Office Action for U.S. Appl. No. 11/873,248, dated Mar. 31, 2010, 18 pages.

Korean Office Action for corresponding Korean Patent Application No. 2008-7025915, dated Feb. 9, 2010.

PCT International Preliminary Report on Patentability for PCT Patent Application No. PCT/US2008/076252, dated Apr. 1, 2010, 9 pages.

PCT International Preliminary Report on Patentability for PCT Patent Application No. PCT/US2008/073646, dated Mar. 4, 2010, 6 pages.

Su, W., et al., "Two Generalized Complex Orthogonal Space-Time Block Codes of Rates 7/11 and 3/5 for 5 and 6 Transmit Antennas", IEEE Transactions on Information Theory, Jan. 2003, vol. 49, No. 1, pp. 313-316.

US Office Action for U.S. Appl. No. 12/209,110 dated Feb. 11, 2011, 20 pages.

US Office Action for U.S. Appl. No. 12/121,649, Apr. 19, 2011, 25 pgs.

US Office Action for U.S. Appl. No. 12/130,821, Feb. 22, 2011, 12 pgs.

US Office Action for U.S. Appl. No. 12/121,634, Mar. 1, 2011, 19 pgs.

US Office Action for U.S. Appl. No. 11/644,638, Apr. 15, 2011, 7 pgs.

European Office Action for European Patent Application No. 09718026.9, Feb. 10, 2011, 3 pgs.

European Office Action for European Patent Application No. 08756664.2, Mar. 17, 2011, 6 pgs.

US Final Office Action for U.S. Appl. No. 11/644,638, dated Apr. 29, 2010, 22 pages.

Korean Office Action for corresponding Korean Patent Application No. 2008-7023249, dated May 27, 2010, 4 Pgs.

European Office Action for corresponding European Patent Application No. 07862325.3, dated Jul. 6, 2010, 6 pgs.

PCT International Search Report for PCT Patent Application No. PCT/US2009/053472, dated Jun. 14, 2010, 7 pgs.

Written Opinion of the International Searching Authority for PCT Patent Application No. PCT/US2009/053472, dated Jun. 14, 2010, 5 pgs.

US Final Office Action for U.S. Appl. No. 12/040,653, dated Jun. 15, 2010, 40 pages.

PCT International Search Report dated Sep. 18, 2008, for PCT/US08/006286, filed May 16, 2008, 4 pages.

Written Opinion of the International Searching Authority dated Sep. 18, 2008, for PCT/US08/006286, filed May 16, 2008, 8 pages.

International Search Report mailed Nov. 6, 2008 for PCT/US08/065675, filed Jun. 3, 2008, 5 pages.

Written Opinion of the International Searching Authority mailed Nov. 6, 2008 for PCT/US08/065675, filed Jun. 3, 2008, 8 pages.

International Search Report for related application WO 08/048651, dated Jun. 25, 2008.

Written Opinion of the International Searching Authority for related application WO 08/048651, dated Jun. 25, 2008.

Communication Relating to the Results of the Partial International Search dated Jan. 31, 2009 for PCT/US07/13074, filed Jun. 1, 2007.

PCT International Search Report dated Apr. 14, 2008 for PCT/US07/23207, 3 pages.

Written Opinion of the International Searching Authority dated Apr. 14, 2008 for PCT/US07/23207, 6 pages.

International Search Report dated Apr. 15, 2008 for PCT/US07/24572, 4 pages.

Written Opinion of the International Searching Authority dated Apr. 15, 2008 for PCT/US07/24572, 6 pages.

PCT International Search Report dated Aug. 20, 2008 for PCT/US08/03274, 4 pages.

Written Opinion of the International Searching Authority dated Aug. 20, 2008 for PCT/US08/03274, 10 pages.

International Search Report dated Apr. 17, 2009 for PCT/US2008/076252, 5 pages.

Written Opinion of the International Searching Authority dated Apr. 17, 2008 for PCT/US2008/076252, 9 pages.

Written Opinion of the International Searching Authority dated Apr. 30, 2009 for PCT/US2007/022189, 8 pages.

PCT International Search Report for PCT Patent Application No. PCT/US2009/035735, dated Jul. 13, 2009, 5 pages.

Written Opinion of the International Searching Authority for PCT Patent Application No. PCT/US2009/035735, dated Jul. 13, 2009, 8 pages.

Lattice Semiconductor Corp., "Turbo Decoder", IP Data Sheet, 2003, 6 pages.

Kao, Chien-Yu, "A Bi-directional SOVA with Normalization for Turbo Decoding", Jun. 2006, Tainan, Taiwan, 72 pages.

Chindapol, Aik, et al., "Design, Analysis, and Performance Evaluation for BICM-ID with Square QAM Constellations in Rayleigh Fading Channels", IEEE Journal on Selected Areas in Communications, vol. 19, No. 5, May 2001, pp. 944-957.

Alamouti, Siavash M., "A Simple Transmit Diversity Technique for Wireless Communications", IEEE Journal on Selected Areas in Communications, vol. 16, No. 8, Oct. 1998, pp. 1451-1458.

Cox, Richard V., et al., "Subband Speech Coding and Matched Convolutional Channel Coding for Mobile Radio Channels", IEEE Transactions on Signal Processing, vol. 39, No. 8, Aug. 1991, pp. 1717-1731.

Hagenauer, Joachim, et al., "The Performance of Rate-Compatible Punctured Convolutional Codes for Digital Mobile Radio", IEEE Transactions on Communications, vol. 38, No. 7, Jul. 1990, pp. 966-980.

Lee, Inkyu, et al., "Space-Time Bit-Interleaved Coded Modulation for OFDM Systems", IEEE Transactions on Signal Processing, vol. 52, No. 3, Mar. 2004, pp. 820-825.

Lee, Heunchul, et al., "A Flexible Space-Time Coding System with Unequal Error Protection", IEEE, 2005, 5 pages.

Lee, Inkyu, et al., "Reduced-Complexity Receiver Structures for Space-Time Bit-Interleaved Coded Modulation Systems", IEEE Transactions on Communications, vol. 55, No. 1, Jan. 2007, pp. 142-150.

Lee, Inkyu, et al., "Code Construction for Space-Time Bit-Interleaved Coded Modulation Systems", IEEE Communications Society, 2004, 5 pages.

Li, Xiaodong, et al., "Bit-Interleaved Coded Modulation with Iterative Decoding and 8PSK Signaling", IEEE Transactions on Communications, vol. 50, No. 8, Aug. 2002, pp. 1250-1257.

Lee, Inkyu, et al., "Code Design of Space-Time Bit-Interleaved Coded Modulation Systems for Maximum Diversity", ICC, Jun. 2004, 11 pages.

Taddei, Herve, et al., Mode Adaptive Unequal Error Protection for Transform Predictive Speech and Audio Coders, IEEE, 2002, pp. 165-168.

Higuchi, K., et al., "Adaptive Selection of Surviving Symbol Replica Candidates ased on Maximum Reliability in QRM_MLD for OFCDM MIMO Multiplexing", in Proc. Globecom, Dec. 2004, pp. 2480-2486.

Wong, K., "The Soft-Output M-Algorithm and Its Applications", PhD Thesis, Queens University, Kingston, Canada, Aug. 2006, 263 pages.

Noh, Y., et al., "Design of Unequal Error Protection for MIMO-OFDM Systems with Heirarchical Signal Constellations", Journal of Communications and Networks, vol. 9, No. 2, Jun. 2007, pp. 167-176.

Seshadri, N., et al., "List Viterbi Decoding Algorithms with Applications", IEEE Transactions on Communications, vol. 42, No. 2/3/4, Feb./Mar./Apr. 1994, pp. 313-323.

Taoka, H., et al., "Field Experiments on Ultimate Frequency Efficiency Exceeding 30 Bit/Second/Hz Using MLD Signal Direction in MIMO-OFDM Broadband Packet Radio Access", Proceedings of IEEE Conference on Vehicular Technology, Apr. 2007, pp. 2129-2134.

Kawai, H., et al., "Independent adaptive control of surviving symbol replica candidates at each stage based on minimum branch metric in QRM-MLD for OFCDM MIMO multiplexing", IEEE Vehicular Techonology Conference, VTC2004, vol. 3, Sep. 2004, pp. 1558-1564.

Wong, K.K.Y., et al., "Low-complexity space-time turbo equalizer with the soft-output M-algorithm for frequency-selective channels", IEEE International Conference on Communications, vol. 4, May 2005, pp. 2251-2255.

Wong, K.K.Y., et al., "Bi-directional soft-output m-algorithm for iterative decoding", IEEE International Conference on Communications, vol. 2, Jun. 2004, pp. 792-797.

Kitty, K.Y. Wong, et al., "Soft-Output Trellis/Tree Iterative Decoder for high-order BICM on MIMO Frequency Selective Rayleigh Fading Channels", IEEE International Conference on Communications, Jun. 2006, pp. 4278-4284.

Papadopoulos, H., et al., "Wideband space-time coded systems with non-collocated antennas", Radio and Wireless Symposium, 2008 IEEE, Jan. 22, 2008, pp. 307-310.

Lee, Inkyu, et al., "Diversity Analysis for Space-Time, Bit-Interleaved Coded Modulation Systems", Korea University, Seoul, Korea, Jan. 2007.

Gencata, et al., "Virtual-topology adaptation for WDM mesh networks under dynamic traffic," Proceedings of IEEE Infocom 2002, vol. 1, Jun. 23, 2002, pp. 48-56.

Koetter, R., et al., "Beyond routing: an algebraic approach to network coding," Proceedings of IEEE Infocom 2002, vol. 1, Jun. 23, 2002, pp. 122-130.

Del Re, Enrico, et al., "Next-Generation Mobile Satellite Networks," IEEE Communications Magazine, vol. 40, No. 9, Sep. 1, 2002, pp. 150-159.

Ernest, P.H.H., et al., "An efficient algorithm for virtual topology reconfiguration in WDM optical ring networks," Proceedings of 10th Conference on Computer Communications and Networks, Oct. 15, 2001, pp. 55-60.

Fasolo, E., "Network coding techniques," www.cs.virginia.edu/{yw5s/Network%20coding.ppt, Mar. 7, 2004, pp. 1-14.

Chou, P.A., et al., "Network Coding for the Internet and Wireless Networks", www.eecs.umich.edu/systems/ChouSeminar.ppt, Mar. 28, 2006, pp. 1-29.

Ahlswede, R., et al., "Network Information Flow", IEEE Transactions on Information Theory, IT-46(4), Jul. 2000, pp. 1204-1216.

Ho, T., et al., "The Benefits of Coding Over Routing in a Randomized Setting", in the Proceedings of the International Symposium on Information Theory (ISIT), Jun. 2003, pp. 1-6.

Katti, S., et al., "XORs in the Air: Practical Wireless Network Coding", in the Proceedings of the ACM Special Interest Group on Data Communication (SIGCOMM), Sep. 2006, 12 pages.

Koetter, R., et al., "An Algebraic Approach to Network Coding", IEEE/ACM Transactions on Networking, vol. 11, No. 5, Oct. 2003, pp. 782-795.

Li, S. R., et al., "Linear Network Coding", IEEE Transactions on Information Theory, IT-49(2), Feb. 2003, pp. 371-381.

Chou, P.A., et al., "Practical Network Coding", 51st Allerton Conference on Communication, Control and Computing, Oct. 2003, 10 pages.

Cormen, T.H., et al., "Introduction to Algorithms", 2nd Edition, MIT Press and McGraw-Hill, 2001, pp. 643-700.

Jafarkani, H., "Space-Time Coding, Theory and Practice", Cambridge University Press, 2005.

Yiu, S., et al., "Distributed Block Source Coding", IEEE GLOBECOM 2005 Proceedings, Nov. 2005.

Su, W., et al., "Signal Constellations for Quasi-Orthogonal Space-Time Block Codes with Full Diversity", IEEE Transactions on Information Theory, Oct. 2004, pp. 2231-2347.

Jafarkani, H., "A Quasi-Orthogonal Space-Time Block Code", IEEE Transactions on Communications, Jan. 2001, 4 pages.

Tirkkonen, O. et al.: "Minimal Non-Orthogonality Rate 1 Space-Time Block Code for 3+ Transmit Antennas," IEEE 6th Int. Symp. Spread Spectrum Tech. and Appl., pp. 429-432, Sep. 2000, 4 pages.

Sharma, N. et al.: "Improved Quasi-Orthogonal Codes Through Constellation Rotation," IEEE Trans. Communications, pp. 332-335, Mar. 2003, 3 pages.

Wang, H. et al.: "Upper Bounds of Rates of Space-Time Block Codes from Complex Orthogonal Designs," IEEE Trans. Information Theory, pp. 2788-2796, Oct. 2003, 9 pages.

El Gamal, H. et al., "Distributed Space-Time Filtering for Cooperative Wireless Networks", GLOBECOM'03, Dec. 2003, pp. 1826-1830.

Sezgin, A., et al., "On EXIT—Chart Analysis of Coherent and Non-Coherent Space-Time Codes", Smart Antennas, 2004, pp. 49-56.

Horn, R.A., et al., "Matrix Analysis", Cambridge University Press, New York, 1994.

Tse, D., et al., "Fundamentals of Wireless Communication", Cambridge University Press, May 2005.

Stott, J.H., "The DVB Terrestrial (DVB-T) Specification and Its Implementation in a Practical Modem", Proceedings of the 1996 International Broadcasting Convention, IEEE Conference Publication No. 428, Sep. 1996, pp. 255-260.

Guerin, R., et al., "Quality-of-Service in Packet Networks: Basic Mechanisms and Directions", Invited Paper, Computer Networks, vol. 31, No. 3, Feb. 1999, pp. 1-16.

Zhang, H., "Service Disciplines for Guaranteed Performance Service in Packet-Switching Networks", in the Proceedings of the IEEE, vol. 83, No. 10, Oct. 1995, pp. 1-23.

Caire, G., et al., "Achievable Throughput of MIMO Downlink Beamforming and Limited Channel Information", Proceedings of IEEE PIMRC, Aug. 2007.

Medard, M., "The Effect upon Channel Capacity in Wireless Communication of Imperfect Knowledge of the Channel", IEEE Transactions on Information Theory, May 2000, pp. 935-945.

Marzetta, T.L., "How Much Training Is Required for Multi-User MIMO?", ACSSC96, Asilomar Conference Oct. 2006.

Viswanath, P., et al., "Sum Capacity of the Multiple Antenna Gaussian Broadcast Channel and Uplink-Downlink Duality", IEEE Transactions on Information Theory, Aug. 2003, pp. 1912-1923.

Peel, C.B., et al., "A Vector Pertrubation Technique for Near-Capacity Multi Antenna Multi User Communication, Part I: Channel Inversion and Regularization", IEEE Transactions on Communications, Jan. 2005, pp. 195-202.

Joham, M., et al., "Linear Transmit Processing in MIMO Communications Systems", IEEE Transactions on Signal Processing, Aug. 2005, pp. 2700-2712.

Osseiran, A., The Winner II Air Interface: Refined Spatial-Temporal Processing Solutions, Online Citation <https://www.ist.-winner.org/WINNER2-Deliverables/D3.4.1.pdf>, Jan. 1, 2007, pp. 1-148.

Bandemer, B., et al., "Linear MMSE Multi-User MIMO Downlink Precoding for Users with Multiple Antennas", IEEE International Symposium on Personal, Indoor and Mobile Communications, Sep. 1, 2006, pp. 1-5.
Catt, "Non-codebook based pre-coding for E-Utra TDD Downlink", 3rd Generation Partnership Project, Oct. 4, 2006, pp. 1-3.
Gomadam, K.S., et al., "Techniques for Multi-user MIMO with Two-way Training", IEEE International Conference on Communications, May 19, 2008, pp. 3360-3366.
Michalke, Clemens, et al., "Linear MOMO Receivers vs. Tree Search Detection: A Performance Comparison Overview", IEEE Internatinal Symposium on Personal, Indoor and Mobile Radio Communications, Sep. 11, 2006, pp. 1-7.
Narayanan, K.R., et al., "Low Complexity Turbo Equalization with Binary Coding", IEEE International Conference on Communications, ICC '2000, New Orleans, pp. 1-5, vol. 1.
Hoeher, Peter, "Advances in Soft-Output Decoding", IEEE Global Telecommunications Conference, Nov.-Dec. 1993, pp. 793-797.
Stiglmayr, Stephan, et al., "Adaptive Coding and Modulation in OFDM Systems using BICM and Rate-Compatible Puntured Codes", 7 pages.
Fasolo, E., "Network coding techniques," www.cs.virginia.edu/{yw5s/Network%20coding.ppt, Mar. 7, 2004, pp. 1-14.
US Final Office Action for U.S. Appl. No. 12/209,110, dated Jul. 14, 2011, 26 pgs.
US Office Action for U.S. Appl. No. 12/335,409, dated Aug. 20, 2011, 20 pgs.
US Notice of Allowance for U.S. Appl. No. 11/664,638, dated Jun. 9, 2011, 10 pgs.
US Office Action for U.S. Appl. No. 11/754,903, dated Jun. 6, 2011, 11 pgs.
US Office Action for U.S. Appl. No. 11/644,638, dated Sep. 30, 2010, 24 pages.
Korean Office Action for corresponding Korean Patent Application No. 2008-7025123, dated Sep. 29, 2010, 3 Pgs.
PCT International Preliminary Report on Patentability for PCT Patent Application No. PCT/US2009/035735, dated Sep. 16, 2010, 8 pages.
European Office Action for corresponding European Patent Application No. 07861675.2, dated Jul. 26, 2010, 4 pgs.
US Office Action for U.S. Appl. No. 11/754,903, dated Sep. 20, 2010, 18 pages.
US Office Action for U.S. Appl. No. 11/939,353, dated Sep. 22, 2010, 15 pages.
Stiglmayr, Stephan, et al., "Adaptive Coding and Modulation in OFDM Systems using BICM and Rate-Compatible Puntured Codes", 7 pages.
Detert, Thorben,"An Efficient Fixed Complexity QRD-M Algorithm for MIMO-OFDM using Per-Survivor Slicing", IEEE 4th International Symposium on Wireless Communications Systems, Oct. 1, 2007, pp. 572-576, Piscataway, New Jersey, USA.
US Notice of Allowance for U.S. Appl. No. 12/538,733, dated Apr. 26, 2012, 6 pgs.
US Office Action for U.S. Appl. No. 12/476,066, dated May 30, 2012, 14 pgs.
US Notice of Allowance for U.S. Appl. No. 12/335,409, dated Jul. 19, 2012, 8 pgs.
US Office Action for U.S. Appl. No. 12/209,110, dated Jun. 12, 2012, 39 pgs.
US Notice of Allowance for U.S. Appl. No. 11/644,638, dated Jun. 9, 2011, 11 pgs.
US Notice of Allowance for U.S. Appl. No. 12/121,634, dated Aug. 12, 2011, 9 pgs.
Li, et al., "Full Diversity Distributed Space-Time Trellis Codes for Asynchronous Cooperative Communications", Proceeding of the IEEE 2005 International Symposium on Information Theory, Sep. 4, 2005, 6 pgs., Adelaide, South Australia, Australia.
Jing, et al., "Distributed Space-Time Codes in Wireless Relay Networks", 2004 IEEE Sensor Array and Multichannel Signal Processing Workshop, Jul. 21, 2004, pp. 249-253.
Japanese Office Action for related Japanese Patent Application No. 2009-513327, Aug. 7, 2012, 3 pgs. *English Translation*.

Stiglmayr, Stephan, et al., "Adaptive Coding and Modulation in OFDM Systems using BICM and Rate-Compatible Punctured Codes", 13th European Wireless Conference, Apr. 1-4, 2007, Paris, France, 7 pages.
Caire, G., et al., "Multiuser MIMO Downlink with Limited Inter-Cell Cooperation: Approximate Interference Alignment in Time, Frequency, and Space", 46th Annual Allerton Conference on Communication, Control, and Computing, Sep. 26-28, 2008, Urbana-Champaign, Illinois, 8 pages.
Caire, G., et al., "Multiuser MIMO Achievable Rates with Downlink Training and Channel State Feedback", IEEE Trans. on Information Theory, May 2009, 31 pages.
US Office Action for U.S. Appl. No. 12/040,653, dated Dec. 11, 2009, 33 pages.
PCT International Preliminary Report on Patentability for PCT Patent Application No. PCT/US2008/003274, dated Sep. 24, 2009, 10 pages.
PCT International Search Report for PCT Patent Application No. PCT/US2007/013074, dated Dec. 2, 2009, 8 pgs.
Written Opinion of the International Searching Authority for PCT Patent Application No. PCT/US2007/013074, dated Dec. 2, 2009, 8 pgs.
PCT International Search Report for PCT Patent Application No. PCT/US2009/046014, dated Nov. 27, 2009, 7 pgs.
Written Opinion of the International Searching Authority for PCT Patent Application No. PCT/US2009/046014, dated Nov. 27, 2009, 8 pgs.
G. J. Foschini, H. C. Huang, M. K. Karakayali, R. A. Valenzuela, and S. Venkatesan, "The value of coherent base station coordination," in Proceedings of the 39th Annual Conference on Information Sciences and Systems (CISS '05), The Johns Hopkins University, Baltimore, Md, USA, Mar. 2005.
Yiu, S., et al., "Distritbuted Space-Time Block Coding for Cooperative Networks With Multiple Antenna Nodes", Computational Advances in Multi-Sensor Adaptive Processing, Dec. 13, 2005, pp. 52-55.
Yiu, Simon, et al., "Optimization of Distributed Space-Time Filtering", IEEE 62nd Vehicular Technology Conference, Sep. 2005, pp. 1829-1833, Piscataway, New Jersey, USA.
Adachi, Koichi, et al., "Iterative Modified QRD-M Based on CRC Codes for OFDM MIMO Multiplexing", IEICE Transactions on Communications, Jun. 1, 2007, pp. 1433-1443, vol. E90B, No. 6, Tokyo, Japan.
Detert, Thorben, "An Efficient Fixed Complexity QRD-M Algorithm for MIMO-OFDM using Per-Survivor Slicing", IEEE 4th International Symposium on Wireless Communications Systems, Oct. 1, 2007, pp. 572-576, Piscataway, New Jersey, USA.
US Office Action for U.S. Appl. No. 11/754,903, dated Mar. 29, 2010, 11 pages.
PCT International Search Report for PCT Patent Application No. PCT/US2009/053471, Dec. 15, 2009, 7 pgs.
PCT Writen Opinion of the International Searching Authority for PCT Patent Application No. PCT/US2009/053471, Dec. 15, 2009, 9 pgs.
PCT International Preliminary Report on Patentability for PCT Appl. No. PCT/US2009/034758, Aug. 31, 2010, 6 pgs.
PCT International Preliminary Report on Patentability for PCT Appl. No. PCT/US2009/046014, Dec. 6, 2010, 7 pgs.
PCT International Search Report for PCT Patent Application No. PCT/US2009/046014, Nov. 27, 2009, 3 pgs.
PCT Writen Opinion of the International Searching Authority for PCT Patent Application No. PCT/US2009/046014, Nov. 27, 2009, 6 pgs.
PCT International Preliminary Report on Patentability for PCT Appl. No. PCT/US2009/053472, Feb. 15, 2011, 5 pgs.
European Office Action for European Patent Application No. 09715574.1, Jan. 11, 2012, 6 pgs.
European Office Action for European Patent Application No. 08832132.8, Feb. 10, 2012, 5 pgs.
US Office Action for U.S. Appl. No. 12/700,585, dated Oct. 15, 2012, 9 pgs.
US Final Office Action for U.S. Appl. No. 12/209,110, dated Dec. 28, 2012, 40 pgs.

US Final Office Action for U.S. Appl. No. 12/476,066, dated Jan. 8, 2013, 16 pgs.

US Final Office Action for U.S. Appl. No. 12/538,739, dated Aug. 3, 2012, 35 pgs.

US Office Action for U.S. Appl. No. 12/546,471, dated Dec. 26, 2012, 11 pgs.

US Office Action for U.S. Appl. No. 12/558,367, dated Feb. 15, 2013, 13 pgs.

US Office Action for U.S. Appl. No. 12/772,717, dated Feb. 13, 2013, 11 pgs.

Sen, et al., "Cute and jCUTE Concolic Unit Testing and Explicit Path Model-Checking Tool", Computer Aided Verification Lecture Notes in Computer Science, Jan. 1, 2006, pp. 419-423.

Majumdar, et al., "Hybrid Concolic Testing", IEEE 29th International Conference on Software Engineering, May 1, 2007, pp. 416-426.

Taddei, Nerve, et al., "Mode Adaptive Unequal Error Protection for Transform Predictive Speech and Audio Coders", Proceedings of the IEEE International Conference in Acoustics, Speech, and Signal Processing (ICASSP 2002), vol. I, pp. 865-868, May 2002.

Marsch, Patrick, et al., On multicell cooperative transmission in backhaul-constrained cellular systems, Annals of Telecommunications, May 1, 2008, pp. 253-269, vol. 63, No. 5/6.

Lang, Yidong, et al., "A Novel Resource Allocation Strategy for Distributed MIMO Multi•Hop Multi-Commodity Communications", JEEE International ITG Workshop on Smart Antennas, Feb. 26, 2008, pp. 125-132.

Karakayali, M., et al., "On the Maximum Common Rate Achievable in a Coordinated Network", Mar. 3, 2006, 6 pages.

Boccardi, F., et al., "Limited Downlink Network Coordination in Cellular Networks", The 18th Annual IEEE International Symposium on Personal, Indoor, and Mobile Radio Communications (PIMRC '07), 5 pages.

Caire, G., et al., "On the Achievable Throughput of a Multiantenna Gaussian Broadcast Channel", IEEE Transactions on Information Theory, vol. 49, No. 7, Jul. 2003, pp. 1691-1706.

Ernesto Zimmermann, "Complexity Aspects in Near-Capacity MIMO Detection-Decoding", Jan. 1, 2007, pp. 39-70.

Ernesto Zimmermann, et al., "Unbiased MMSE Tree Search Detection for Multiple Antenna Systems", Proceedings of the International Symposium on Wireless Personal Multimedia Communications, Sep. 1, 2006, pp. 806-810.

\* cited by examiner

INTER-CELL APPROACH TO OPERATING WIRELESS BEAM-FORMING AND USER SELECTION/SCHEDULING IN MULTI-CELL ENVIRONMENTS BASED ON LIMITED SIGNALING BETWEEN PATTERNS OF SUBSETS OF CELLS

PRIORITY

The present patent application claims priority to and incorporates by reference the corresponding provisional patent application Ser. No. 61/092,722, titled, "An Inter-Cell Approach to Operating Wireless Beam-forming and User Selection/Scheduling in Multi-Cell Environments Based on Limited Signaling between Patterns of Subsets of Cells" filed on Aug. 28, 2008.

FIELD

The present invention relates to the field of wireless downlink transmission in a multi-cell wireless environment.

BACKGROUND

A conceptual example of an arrangement of cells is shown in FIG. 1. Each cell (e.g., 100, 110, 120 ... 190) includes a subset of transmit antennas and base stations of a larger wireless network. In FIG. 1 there is one subset of antennas per cell, and one base-station per cell, with each subset of antennas is located at a base-station. The subset of transmit antennas and base stations serve mobile wireless devices operating with the geographical region of the cell.

The term "cell" herein refers a geographic area in which a subset of transmit antennas, or a subset of base-stations, jointly transmit signals produced by a single common physical layer mechanism over these antennas to a subset of users. Antennas within each cell transmit useful signals only to users within that cell. In many prior art systems cellular systems cells often operate independently on many operations, e.g. in scheduling users and creating transmissions on their respective antennas.

In general, the transmitted signals can be generated by using one in a number of possible transmission techniques, e.g. single-input single-output (SISO) transmission; multiple input multiple output (MIMO) transmission; and, multi-user MIMO (MU-MIMO) transmission whereby multiple antennas coordinate a joint concurrent transmission to multiple users. The underlying structure of transmissions can be based on, for example, Orthogonal Frequency Division Multiplexing (OFDM), Code Division Multiple Access (CDMA), etc. In some networks, beam-forming is used, i.e. MIMO or MISO is used to form beams to concurrently serve different users).

In any such cellular scenario, if neighboring base stations (cells) use the same transmission resource (e.g. the same frequency band at the same time), users in a cell will experience interference from other cells. Such interference, often termed "inter-cell interference", can be quite extreme near the edges of cells, thus limiting performance in such areas. For example, users such as user4 and user5 in FIG. 1 can experience high inter-cell interference levels. This is a classic problem with cell structures, and is true for SISO, MIMO and MU-MIMO transmissions.

Alleviating the effect of inter-cell interference is a very important problem, particularly in systems with multiple antennas, as in Multiple Input Multiple Output (MIMO) systems, Multiple Input Single Output (MISO) systems, and Single Input Multiple Output (SIMO) systems. Without interference, i.e. in an isolated cell free from inter-cell interference, MIMO techniques in principle can allow one to consider a system where the transmission rates in terms of bits/sec/Hz scale linearly with the number of transmit antennas. Here the rate (or throughput) of a system is generally linked to a term of form "log(1+S/noise)", where "S" is a signal "energy" term which can be made to grow in such a way that throughput scales almost linearly with the number of transmit antennas used. Given this, MIMO systems have the potential to produce very large transmission rates in the order of many bits/sec/Hz especially when used with moderate to large numbers of antennas. Note, the term "noise" is random noise that may be present in the channel, such as thermal noise. We can assume "noise=1" with S scaled appropriately.

However, with interference the transmission rate has a different general form of "log(1+S/(1+Q))". Here "Q" is the interference energy term, which includes energy from inter-cell interference, including interference from MIMO systems in adjacent cells. Given the nature of MIMO systems, the effect of interference terms can, similar to the signal term "S", also grow fast with the number of antennas. As a result the growth of the effective ratio "S/Q" is much smaller than that of "S" in the isolated cell case, and throughput of the MIMO systems in a multi-cell environment can be severely degraded relative to that predicted for the case of isolated cells without interference.

There are many methods for alleviating multi-cell interference. Some techniques include, for example, frequency reuse which controls interference by dividing transmission resources over cells. Specifically the idea is to constrain adjacent cells not to use the same time/code/frequency resource, or sufficiently to ensure cells using the same resource are geographically separated. This is what happens in a classic cellular "frequency reuse" pattern where resources are divided in terms of frequencies, as illustrated in FIG. 2, or in an OFDM system which constrains cells to use different tones at different times, or as in a CDMA system which constrains cells to use different codes.

FIG. 2 illustrates a prior art frequency reuse cell arrangement. The example of FIG. 2 illustrates a frequency reuse factor of three. In this example, a first subset of cells (200a, 200b and 200c) use a first subset of frequencies, a second subset of cells (210a, 210b and 210c) use a second subset of frequencies and a third subset of cells (220a) use a third subset of frequencies.

In the classic cellular system example illustrated in FIG. 2, the network can utilize three different frequencies (with a frequency reuse factor of three) so that no two neighboring cells use the same frequency. The separation between cells (distance separation) that use the same frequency helps in reducing the interference between cells (the "inter-cell interference"). Specifically, users such as user4 and user5 have interfering cells which are now further away. As an example, users in cell 200a have the nearest interfering cells as cells 200b and 200c, and do not experience interference from 200a, 210a or 210b. However the efficiency of the system can be hurt because the frequency-reuse reduces the effective number of frequencies (the bandwidth) used for signaling information to users in each cell. With a frequency reuse factor of "F", the rate of such a system scales as "(1/F)log(1+S/Q)". Therefore, even when one reduces the effect of "Q", the price paid in the pre-log scaling of "1/F" can offset such benefits. Furthermore there are additional losses in efficiency by not exploiting diversity among frequencies. This can further reduce the effective rates a user may receive even more.

Therefore, while these techniques are simple and effective in controlling interference, they are not necessarily the most efficient methods since they can be overly conservative limiting the potential reuse of transmission resources for the "S" term. This is also particularly true for MIMO systems where the use of multiple antennas allows one to consider division of resources also in space, not only in the time, frequency or code domains.

Another method to control interference is to have all cells coordinate and jointly design their transmissions with each other. For example, Network MIMO systems can create joint transmissions whereby signals radiated from multiple base-stations are jointly created across such base-stations and can be intended for uses in multiple cells. For example, a NW-MIMO system for FIG. 1 may allow BS1, BS2, and BS3 to jointly signal together to serve user4 and user5. This is an example of limited coordination over a cluster of cells. In the extreme a NW-MIMO system may provide full coordination over cells. Multi-user MIMO (MU-MIMO) techniques are effective techniques to consider for such systems since they can create transmissions operating across multiple cells, and also implicitly control interference. Specifically some of these techniques, e.g. Linear Zero Forcing, use knowledge of the channel state between users and transmission antennas to jointly control both signal and interference to each of the scheduled users. Such techniques however can require large amounts of channel state information (CSI) in the form of vectors of complex-valued numbers. This can be a significant system overhead. When MU-MIMO is used with user selection, such CSI often has to be obtained for a large pool of users from which a subset is to be selected. Therefore, in the final transmission, full CSI has been obtained from many users that are not scheduled. As the number of transmit antennas and users grow, the overhead grows and can be quite large.

Such fully coordinated and/or large MU-MIMO multi-cell systems may not be practical in some deployments. The complexity of coordinating all antennas, problems of asynchrony in reception of signals from highly geographically separated antennas to any given user, and the amount and latency of information that needs to be shared between remote base-stations (antennas) over the backbone infra-structure, can make such interference control techniques difficult to scale over many cells.

It is therefore of interest to consider cellular systems, whereby antennas in each cell only serve users in the cell, but for which some coordination between cells allows for control of inter-cell interference (ICI). Such techniques are being considered in the "Coordinated Multi-Point" (CoMP) effort within 3GPP LTE. There are multiple ideas also in the research community. Often such ideas look at systems within small clusters of coordinating cells, or in small deployments of cells.

SUMMARY

Methods, systems and apparatuses for operating a multiple-cell network, each cell having at least one wireless transmission entity are disclosed. The multiple cells are divided into subsets of cells, each subset having one or more cells. The subsets of cells each have an associated priority that can be changed over transmission resources. The cells from the same subset are able to operate their associated transmission processes independent of each other without, for example, requiring exchange of transmission parameter or other information between such cells of the same subset.

Cells of lower priority utilize transmissions and transmission parameters from cells of higher priority in determining their own transmission parameters. Scheduling and transmission parameter operations for the multi-cell system are performed starting with a highest priority subset of cells, and ending with a lowest priority subset of cells. The scheduling and transmission parameter information is forwarded from each of the base stations in the subset of cells having a higher priority to selected number of base stations in a subset of cells having a lower priority.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
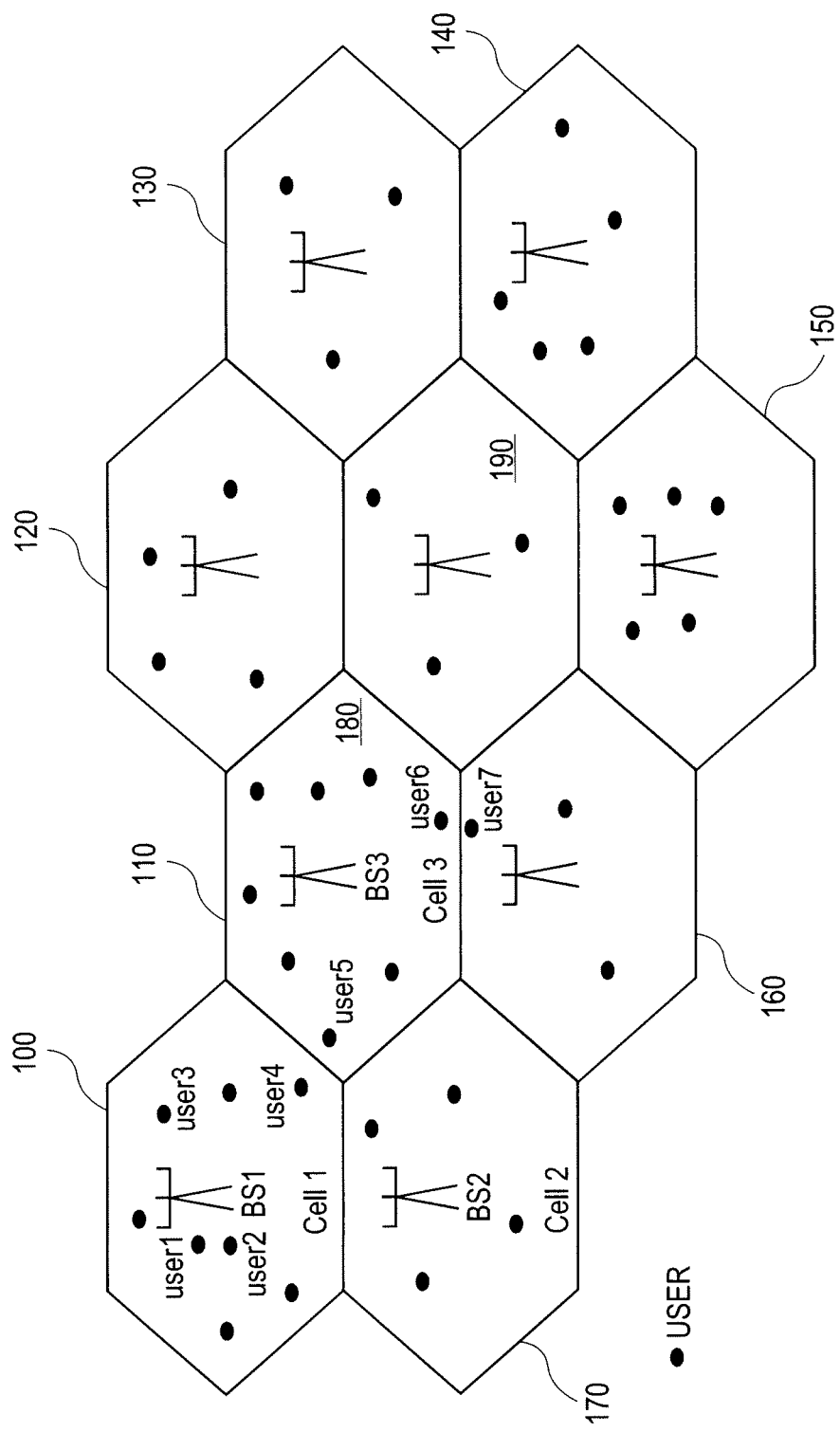
FIG. 1 illustrates a conceptual arrangement of multiple cells in a wireless system which would apply to the case of centrally located base-stations with omni-directional antennas.

In the following description, numerous specific details are set forth. However, embodiments of the invention may be practiced without these specific details. In other instances, well-known circuits, structures and techniques have not been shown in detail in order not to obscure the understanding of this description.

As discussed above, current multi-cell networks suffer from several limitations including, for example, the following. The throughput of a multi-cell wireless system with no coordination between cells can be interference limited. This is due to inter-cell interference (ICI) which limits the rate the system can support. For MIMO systems, the per-cell throughput is also limited, and often can not be made to grow significantly either with increased transmission power and/or increased numbers of deployed antennas due to this ICI.

Systems with full coordination or coordination among clusters of cells, whereby groups of cells (base-stations) jointly signal and serve users over multiple cells, can reduce inter-cell interference to increase per-cell throughput. However, such joint signaling approaches can require large amounts of channel-state information, and large overheads to share information between cells. In addition, there are implementation challenges such as maintaining timing and synchrony between coordinated transmissions between various cells.

Multi-user MIMO systems form a group of options for signaling both within cells and in cluster based systems. These systems allow multiple users to be served simultaneously, exploiting the spatial dimensions when using multiple transmit antennas. Many such techniques, such as linear zero forced beamforming (LZFB), apply signals to beams, where such beams calculated as a function of the channel state of their users. Such techniques often require full channel-state information in order to form beams with which to serve users. In general such information is of the form of complex vectors of channel coefficients. Obtaining such information for all users, including those not eventually scheduled, can be a large overhead in a multi-cell environment. Accuracy and sensitivity with respect to this information is also an issue.

Described herein are techniques known that may be referred to as "Random" or "Opportunistic" beamforming. In various embodiments, beams are not calculated, but either selected at random or selected from a codebook of such beams. To serve users, a system does not require full channel state information from users. Rather, a system often requires only an indication of the useful signal level with respect to the beam, or beams, being used.

Described herein are methods, architectures and techniques of operating a joint beam-forming and user-selection system across multiple cells for downlink communication in a multi-cell environment. The method outlines a system which coordinates beam and user selection across multiple cells, but is strictly cellular in the sense that users are served (i.e. given their intended data) only from the signals from one cell. There is provided methods, architectures and techniques to control the level and effect of inter-cell interference through a partially coordinated multi-cell process of user scheduling and beam selection. In one embodiment, the method includes multi-step techniques that can scale to large numbers of cells, specifying which operations remain as independent operations within a cell, and which operations, with what cells, require information exchange. The control of interference results in tangible benefits such as improving the rate the multi-cell system can support, in terms of sum throughput and/or individual user rates and/or fairness.

The methods, architectures and techniques described herein also significantly reduce the amount of inter-cell coordination and signaling required for operation as compared to prior techniques such as Network MIMO and coordinated MU-MIMO systems over clusters of cells.

In various embodiments, combinations of the following principles may be utilized: 1) dividing cells into different subsets whereby cells within the same subset are made to operate independently of each other; 2) operating the decision making processes, such as beam selections, users to schedule, and rates to schedule users, in an ordered fashion from one subset to the next subset; 3) using the ordered process to achieve and define potential limited and staged information exchanges between cells in different subsets; 4) leveraging beam-forming and beam-pilots to simplify the type of, or even eliminate, backbone signaling (nature and amount of information) required by and shared between cells; 5) varying the order of subsets of cells in cells across transmission resources, e.g. time slots and/or frequency bands or spreading codes in CDMA, so as to ensure fairness between subsets.

Many of these features, in particular 1)-4), allow many cells and processes to operate as if cells were independent isolated cells. This ability to operate some or all processes independently significantly reduces the system's complexity. Sufficient signaling (e.g. implicitly by wireless pilots or explicitly by inter-cell backbone communication) is maintained between only limited subsets of cells. Such signaling is used for purposes such as, for example, to allow for the control of interference with a small system overhead. Such limits and clear specification of signaling also allows for a system which can scale with increased numbers of cells.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The description also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language.

Described herein is a process applied to a network of wireless base-stations or wireless transmitting entities, each station or entity serving a geographical area (e.g. cell) or group of users. We shall describe the process as it applies to the case that geographic areas are deemed as cells. The process allows the multi-cell network to control the inter-cell interference users experience by controlling the inter-cell interference between subsets of cells. This can result in increased wireless throughputs.

The process itself can do so with reduced signaling exchanges between cells and only partial coordination between some cells. In particular, cells are divided into subsets, which are given an ordered priority for each transmission opportunity (scheduling decision and associated data transmission to a user). In one embodiment, within each subset of cells, there are no such signaling exchanges required between cells. That is, cells within each subset operate independently. Between different subsets there can be signaling exchange requirements, and these are clearly specified by the relative priority of the subsets. Furthermore, the types of information exchanges used between, individual cells often requires less overhead and less accuracy than many alternative MU-MIMO techniques.

The network operates by dividing the cells into a number of subsets. For each transmission opportunity the subsets are ordered CellSet(1), CellSet(2), . . . , CellSet(N), where at least one subset has more than one member (one cell). Within any subset, e.g. CellSet(j), member cells are allowed to operate independently of each other. Thus there is no need to share signals or user information between such cells greatly reducing system complexity with respect to fully coordinated systems (effectively a system for which each subset consists of only one cell).

Figure 2:
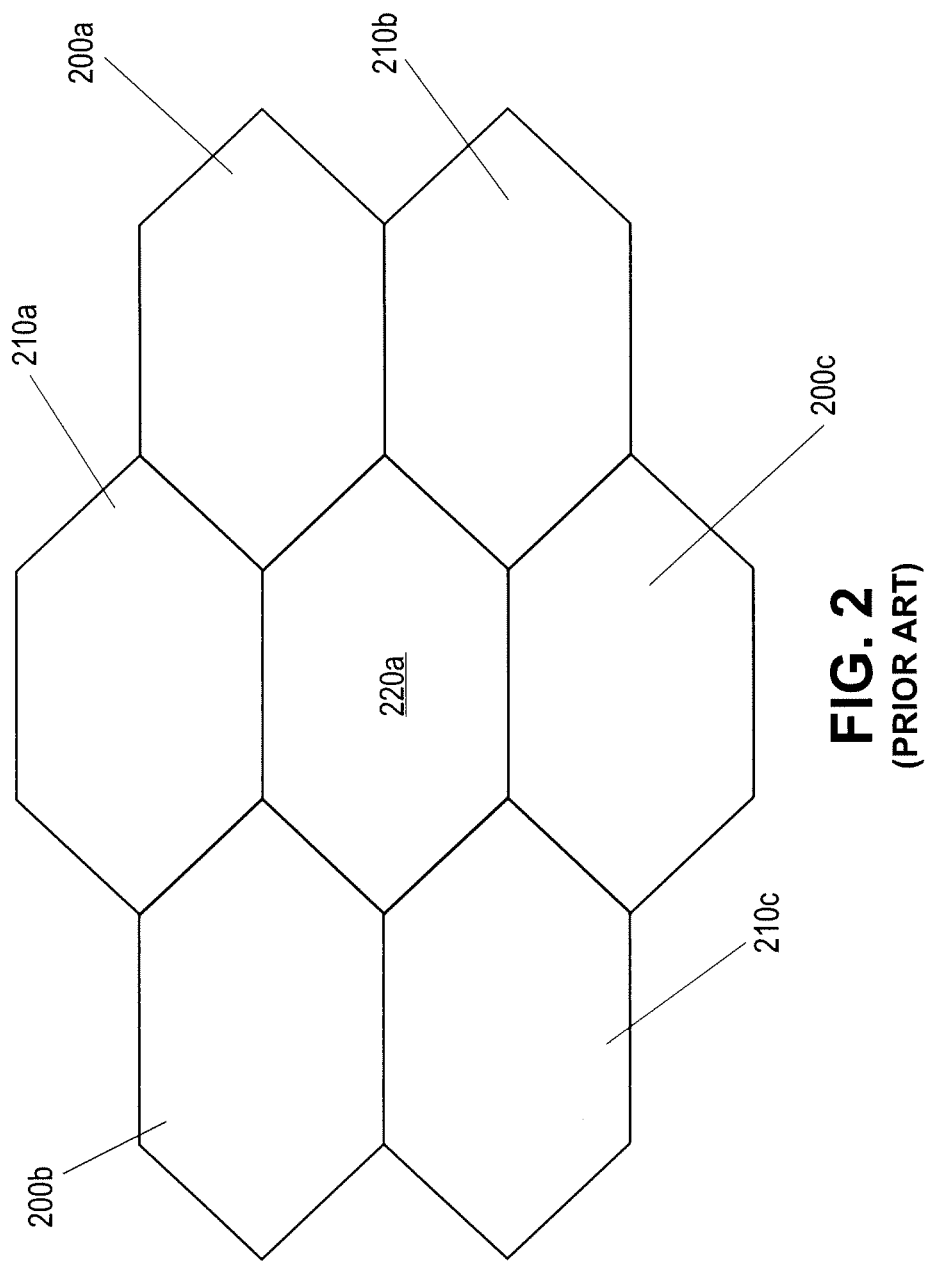
FIG. 2 illustrates a conceptual arrangement of cells utilizing a frequency reuse factor of three.
Figure 3:
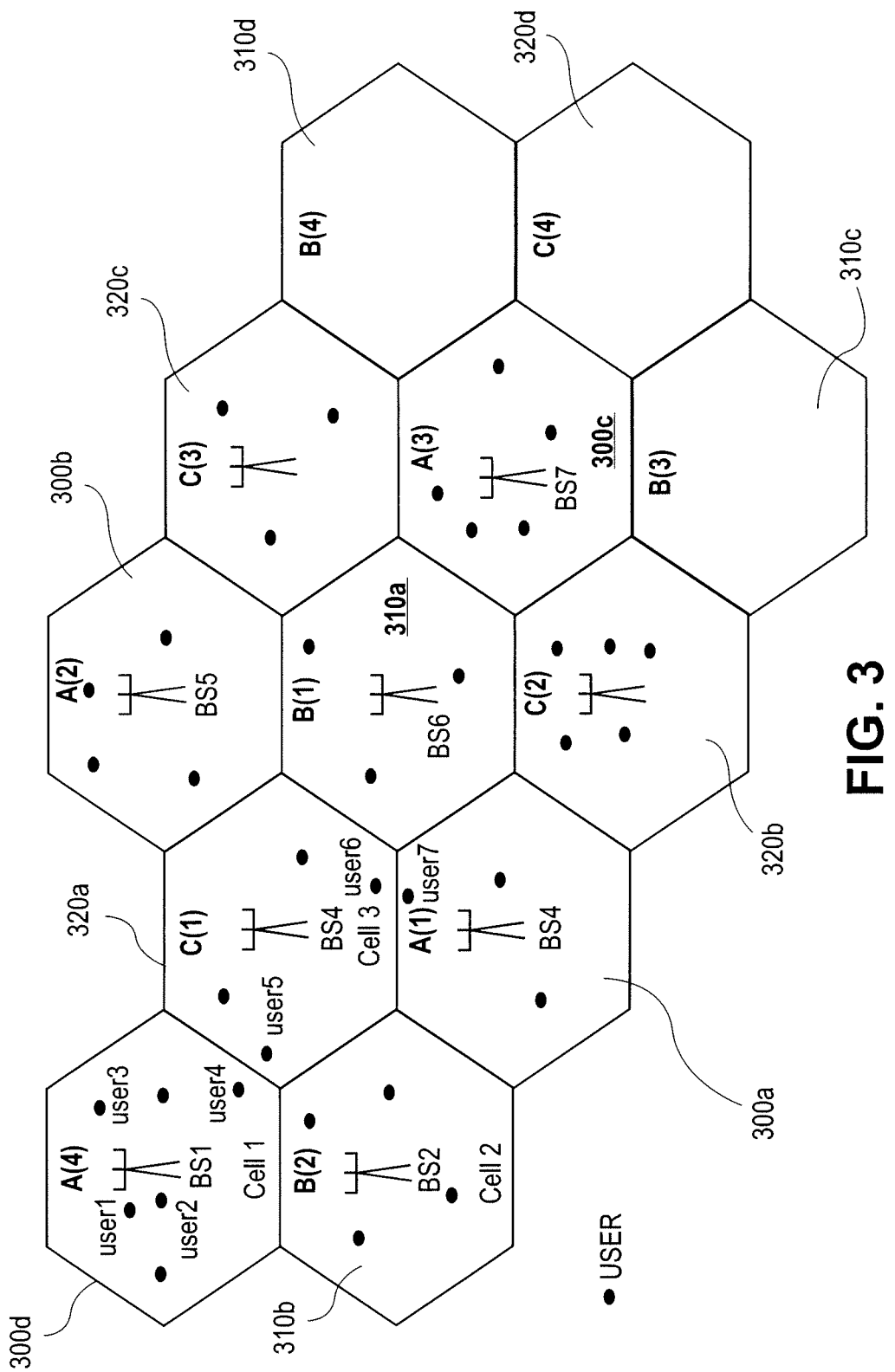
FIG. 3 illustrates conceptual arrangement (pattern) of cells which can apply to frequency reuse factor one, but where cell subsets have associated priorities in a multi-step coordination algorithm.

FIG. 3 illustrates such an example where there are three subsets. The grouping of cells in FIG. 3 is not in relation to specifying of frequencies as in the example of FIG. 2. Rather, the grouping of cells in FIG. 3 indicates subsets of cells. The system of FIG. 3 can have any frequency reuse including a frequency reuse of one. The subsets do not specify transmission resources.

As illustrated in FIG. 3, one subset has cells 300a, 300b, 300c, 300d, and another subset has cells 310a, 310b, 310c, 310d, and another subset has cells 320a, 320b, 320c, 320d. In contrast to FIG. 2, all cells, in all subsets may use the same transmission resources, e.g. the same frequencies at the same time.

Cells in each subset, i.e. subset "CellSet(k)", make operational decisions independently of each other. These include their individual user scheduling decisions, beamforming solution calculations, and signaling required to obtain information necessary for these processes. Such operations for a cell may assume any instantaneous operation or decision of cells within the same subset, though they can assume some nominal, i.e. average, behavior such as an average interference level. Once such independent processes are complete for all cells in a subset, each cell in CellSet(k) sends a relatively small amount of information to a small number, (e.g. three) cells in the subset of next priority, i.e. CellSet(k+1). The network can also indirectly send, i.e. forward, relevant information from CellSet(1), . . . , CellSet(k−1) to cells in CellSet (k+1). To do this a cell in CellSet(k) may forward information it may have received from cells from CellSet(k−1), and so on. By induction it is possible for information about some cells in CellSet(1) to reach some cells in CellSet(k+1), k>1. Note, it is not necessary for all cells in CellSet(k) to communicate to all cells in CellSet(k+n), for n=1, 2, . . . , N−k. It is also not necessary for direct communication between a cell in CellSet (k) and one in CellSet(k+n) for n≥2. For example, cell 300a in FIG. 3 may only have to send information to cells 310a and 310b.

Based on this limited inter-cell information exchange, each cell in CellSet(k+1) makes its own independent decisions (independent of other cells in the subset). These include user scheduling decisions and beamforming solutions. Such decisions can be required to consider the effect of such decisions (i.e. of the beams it chooses, designs and/or schedules) on relevant scheduled users in cells from prior subsets Cellset(1), . . . , CellSet(k). In general, a cell in CellSet(k+n), n≥1, tries to limit the interference it creates to scheduled users in a select number of cells from CellSet(1), . . . , CellSet(k).

Once scheduling in a CellSet(k+1) is complete, the process continues as before with each cell in CellSet(k+1) passing a relatively small amount of information to a small number of cells in CellSet(k+2). Cells in CellSet(k+2) make their independent (or each other) decisions and the process continues until all cells in all subsets have made scheduling decisions. In one embodiment, at this point transmission begins.

Between subsets, inter-cell information exchange can be direct, can be implicit, or can be both. Implicit exchanges are supported, for example, through present or past pilot signals that are present in probing wireless transmissions. For example, cells in CellSet(k) may transmit a number of pilot signals on beams they select. When a pilot signal is applied to a beam it provides a signal with which a recipient can measure the effect, e.g. strength as seen through a channel, of that beam. Given the broadcast nature of the wireless medium such pilots can be sensed by user terminal in cells in subsets CellSet(k), CellSet(k+1), . . . without direct signaling between base-stations. Such pilots can also be sensed by user terminal in cells in subsets CellSet(k−1), CellSet(k−2). The pilots can be used to estimate interference with respect to such pilots without any cell in CellSet(k) having to send direct transmissions to any cell of any other subset.

The user terminal, having information with respect to a beam pilot, can forward that information to the station of its serving cell. They can also choose not to forward such information but rather to combine such information with information from other beam pilots and send information which is a function of collective pilot information. A user terminal may also choose not to send any such information to its station.

Direct information exchanges between cells are of the form of the identifying indices (ID)s of scheduled users, beam IDs, etc. In one embodiment, these are (simple) integer valued quantities. Note, in such direct inter-cell exchanges all cells in CellSet(j) do not communicate with all cells in CellSet(k), k>j. In one embodiment, information for each cell in CellSet (j) only propagates (either directly or through forwarding of such information) to a group of cells in the sets CellSet(j+1), CellSet(j+2), . . . .

Furthermore, in the embodiment described the cells in CellSet(j) are the only cells sending such information directly to cells in CellSet(j+1). In fact, in the embodiment there may be no need for direct communication between any cell in CellSet(j) and any cell in CellSet(j+n) for n≥2. Cells in CellSet(j) not only sends its own information to cells in CellSet(j+1), it can also forward information it may have gotten from cells in CellSet(j−1). One can see this enables cells from CellSet(j−n), n>1, to indirectly send information to cells in CellSet(j). With these features the direct inter-cell overhead is greatly reduced. Again, many other exchanges are implicit, as supported through the sensing of beam pilots.

Pilot-based information exchanges are efficient means of obtaining inter-cell "Channel Quality Information" CQI and (optionally) Channel State Information (CSI). This information is utilized in making scheduling decisions and selecting beams. In some embodiments the CQI information can represent the energy a user terminal sees from a beam pilot. The CQI information can also be a function of information collected from many beam pilots.

To describe embodiments of CQI information a case that assumes users (user terminals) within each cell each have one receive antenna is presented. User terminal can also be equipped with multiple antennas. However in this description, and without loss in generality, descriptions based on one receive antenna simplify the exposition.

Downlink transmissions from the "M" antennas in each cell, possibly located at the base-station, to UTs in the cell are made by creating a number of beams and placing transmitted data streams (streams of coded and modulated symbols as known to those familiar with the state of the art) on such beams. Within any cell a beam "$b_k$", or beamforming vector, is a complex M vector, which we will consider without loss in generality to be of unit norm (scaling to non-unit norm can be accounted for in the data-streams, or power applied to a stream).

$$b_k = (b_{1k}, b_{2k}, \ldots, b_{Mk})^T$$

Each element in the vector is complex term representing a scaling and phase term that is applied to an individual antenna. For transmission a signal stream $s_k$ and power $p_k$ is applied to this beam (beamforming vector). Here the stream itself is a row vector, say over time "t", i.e. $s_k = s_k(t1), s_k(t2), s_k(t3), \ldots$, where t1, t2, t3 are slots in time. The power $p_k$, $p_k \geq 0$, is a real valued scalar. A number "m" of such beams can be scheduled for transmission concurrently and in the same band. With this the signal "S" radiated from the transmission antennas in the cell at this time and in the band has form $$S = \sum_{j=1}^{m} p_j s_j b_j$$

The channel between UT(j)'s single receive antenna and the M transmission antennas of the base-station is a complex M vector $h_j$, of form $$h_j = (h_{1j}, h_{2j}, \ldots, h_{Mj})^T$$

This is termed the Channel State Information (CSI) for UT(j). It includes a number of effects such as path loss, fading, etc. With these quantities, one can describe the received signal $S_{i_k}$ that UT($i_k$) sees from the transmission antennas as $$S_{i_k} = \sum_{j=1}^{m} \sqrt{p_j}\, s_j(b_j, h_j)$$

where (x,y) denotes the mathematical inner-product between the two vectors. Assume the data signal $s_k$ on beam $b_k$, k:1≤k≤m, is intended for the $i_k$-th user terminal, UT($i_k$), which is scheduled by its base-station to receive such data. Within the sum "$S_{i_k}$" above, the effective signal term received by UT($i_k$) is that from beam $b_k$, i.e.

$$\text{Intended Signal} = \sqrt{p_k}\, s_k(b_k, h_{i_k})$$

and the effective interference received are terms from the unintended signals, i.e.

$$\text{Interference Signal} = \sum_{j \neq k} \sqrt{p_j}\, s_j(b_j, h_{i_k})$$

If we assume all signal streams $s_k$ are of unit norm, and are all mathematically independent of each other, then the useful signal energy UT($i_k$) sees from the transmission is $$\text{Useful Signal Energy} = p_k |(b_k, h_{i_k})|^2$$

and the interference energy is $$\text{Interference Energy} = \sum_{j \neq k} p_j |(b_j, h_{i_k})|^2$$

Here, in one embodiment, the terms of form $$p_j |(b_j, h_{i_k})|^2\, j = 1, \ldots, m$$

are what we call Channel Quality Information (CQI) terms for UT($i_k$) with respect to the beam $p_j$ of this cell. The sum-terms "Useful Signal Energy" and "Interference Energy" represent another form of CQI which is a function of multiple individual energy measures. Each term, whether as a sum or an individual term with respect to a single beam, is a real positive valued scalar. They are often sufficient to describe effect signal and interference energies seen by users. There is no need to know individual Channel State Information (CSI) to estimate or obtain these energies. Also, the CQI information itself is of the form of scalar valued indices and thus requires less overhead to describe with sufficient accuracy than multi-dimensional, positive and complex, CSI terms. Base-stations can also send pilots so that the CSI itself can be estimated.

Any base-station can send pilots so that such CQI can be estimated with respect to its transmissions. A pilot is broadcast on the wireless medium, thus a pilot sent by a station in "cella" can also be received by users in cells other than cella. Note that the channel vector now more generally is a function of not only the user but which base-station sending the pilot. For "users)" and base-station "n" the CSI is more generally a complex M vector $h_j^n$, of form $$h_j^n = (h_{1j}^n, h_{2j}^n, \ldots, h_{Mj}^n)^T$$

Note, users cells in a cell of a given cell subset can in fact use past pilots which are sent from other cells of subsets with lower priority, i.e. cells in prior cell subsets in the process order. The user terminal knows when such pilots are transmitted and then sense them. To keep the exposition simple, and without explicitly writing all quantities, it should be clear to those familiar with the art that beams $b_k$ and powers $p_k$, can also be indexed additionally by the originating base-station index "n". Thus the CSI and CQI information mentioned previously can now be indexed additionally by "n", referring to the base-station (cell) in question. One such CQI value would refer to a particular beam intended for user(j) transmitted from its own base-station. All other beams from its base-station not intended for this user terminal, and all other beams from other stations, become interference. Pilots, whether from a user's cell or other cells, enable one cell to provide information to users in another cell about interference levels, as measured through CQI values. This form of implicit inter-cell information exchange helps simplify inter-cell signaling.

By knowing the user IDs of the scheduled users in CellSet (1), . . . , CellSet(k), a cell "cella" in CellSet(k+1) is able to limit the request of relevant inter-cell CQI information to a subset of the scheduled users in a subset of cells in CellSet(1), . . . , CellSet(k). Information, for example, includes CQI, both sum and individual, such users measure with respect to beam-pilots sent by "cella" in CellSet(k+1).

By knowing the beam IDs of the scheduled beams in CellSet(1), . . . , CellSet(k), a cell in CellSet(k+1) is able to request inter-cell information from its own users for only on the subset of the scheduled beams from cells in CellSet(1), . . . , CellSet(k). Note, all the users in the cell have obtained this information from when cell pilots were sent by cells in CellSet(1), . . . , CellSet(k). In one embodiment, feedback of either type of information may happen within the regular feedback exchanges within the cell. In another embodiment such information does not need to be individual CQI values but simply the sum over all CQI values, i.e. sum over all beams and channels to respective stations of the values $p_j|(b_j,h_{i_k})|^2$.

Such collected information would be a measure of the interference level "Q", mentioned in the background section, as seen by the "user" in a cell in CellSet(k+1) and coming from all interfering cells in CellSet(1), ..., CellSet(k). Note, because a step-wise priority of subsets of cells is utilized, the measure ignores interference that comes from other cells within CellSet(k+1).

For cells in the same subset, in one embodiment subsets are chosen as in FIG. 3 to constrain (limit to a low level) the level of interference between cells in the same subset. For example, cells in the subset may be geographically separated. In one embodiment the order of subsets specifies a requirement that cells in Subset(k) limit the interference they produce to users in subsets Subset(j), j<k.

The ordered process limits the required information exchange and allows the system to scale well with the number of cells. However, in general, the ordered process of the system would give an advantage to Subset(k) over subsets Subset(k+1), ..., Subset(k+N) because Subset(k) does not consider users or beams in Subset(k+n), n≥1. However, the order and definition of the subsets can be different in different frequency bands and time instances. For example, if there are two subsets Subset(A) and Subset(B), for some time instances or frequency bands, Subset(1)=Subset(A) and Subset(2)=Subset(B), and for other time instances of frequency bands, Subset(1)=Subset(B) and Subset(2)=Subset(A). The latency required for inter-cell communication and steps from each Subset(k)→Subset(k+1), implicit or direct, may be controlled by staggering such exchanges and pilots with respect to on-going transmissions.

One such subset pattern that may be used is similar in spirit to that described in the frequency reuse pattern in FIG. 2; however, the operation fundamentally differs in the sense that all cells can use the same time and frequency resources. That is frequency reuse factor one can be used. The pattern is for ordering purposes and subset identification purposes only. Such a pattern is illustrated in FIG. 3 using N=3 subsets labeled "A" (cells A(1)=300a, A(2)=300b, A(3)=300c and A(4)=300d), "B" (cells B(1)=310a, B(2)=310b, B(3)=310c and B(4)=310d), "C" (cells C(1)=320a, C(2)=320b, C(3)=320c and C(4)=320d). The example of FIG. 3 provides a limited number of cells and a limited number of sub-sets; however, any number of cells and any number of subsets can be supported. Cells within a subset may be chosen in a way so that the cells, due to geographic separation, shadowing, etc, are assumed to interfere minimally with each other. Cells from different subsets however do interfere with each other.

Figure 4:
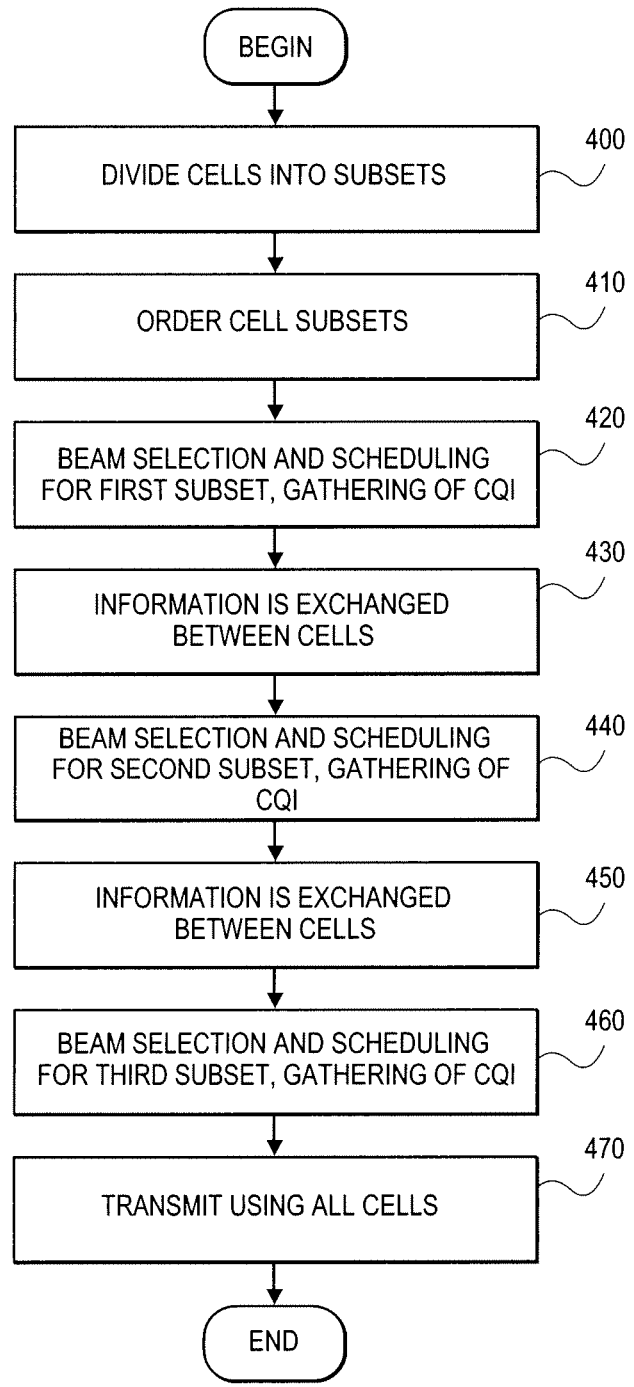
FIG. 4 is a flow diagram of one embodiment for a technique for operating a cell-based wireless network using limited signaling between cells.

FIG. 4 is a flow diagram of one embodiment for a step-wise technique for operating a cell-based wireless network using limited signaling between cells. In one embodiment, each cell is equipped with a number of transmission antennas. These can be located at a single base station, multiple coordinating base-stations, or be distributed geographically in the cell as in a distributed antenna system (DAS). Cells may have the same or different numbers of antennas.

In the examples that follow, the system is described as having cells with a single base-station and the same number of antennas "M" in each cell without loss in generality; however, alternate configurations can also be supported. Users (e.g., user terminals, user terminal, hereinafter "UTs") within each cell can also be equipped with multiple antennas. However in our description, for simplicity and without loss in generality, user terminals (UTs) have a single receive antenna each.

The cells of the wireless network (or system) are divided into subsets, 400. The description of FIG. 3 is one such possible division; however, different cell arrangements in terms of, for example, numbers of cells and/or numbers of subsets, can also be supported. Without loss in generality we will use labels "A", "B", "C", ... to refer to un-ordered subsets.

The cell subsets are ordered, 410. The order can be considered a mapping of labels "A", "B", "C", and so on, to ordered indices 1, 2, 3, ... where "1" has higher priority than "2", "2" has higher priority than "3", and so on. Subset ordering may be pre-programmed into the base stations and/or ordering may be accomplished by operation of an external controller that can communicate with the base stations. We will describe, without loss in generality, the operation with three labels "A", "B" and "C" to three ordered indices 1, 2, and 3.

In one embodiment, the order and assignment of such subset labels "A", "B" and "C" can vary. For example, for one time instance and/or frequency band we can consider that CellSet(1)=CellSet(A), CellSet(2)=CellSet(B), CellSet(3)=CellSet(C). In another we can have CellSet(1)=CellSet(B), CellSet(2)=CellSet(B), CellSet(3)=CellSet(A), etc. The first order is used in the description that follows, referring to the A cells as those forming CellSet(1), with B cells in CellSet(2) and the C cells CellSet(3) without loss in generality.

Also note that subset definitions are not required to follow the pattern illustrated in the figures. There can also be N=2, or N>3, subsets. Also, while the following description of the network involves a sequential process from CellSet(1)→CellSet(2)→CellSet(3), the process can follow in general a tree structure. For example, if there are N=5 subsets, one process could be made of two branches CellSet(1)→CellSet(2)→CellSet(3)
CellSet(1)→CellSet(2)→CellSet(4)→CellSet(5)

which implies a network where CellSet(3) and CellSet(4) both depend on CellSet(1) and CellSet(2), but do are not (in the system design) made to depend on each other.

Beam selection and scheduling is performed for the first subset "CellSet(1)", by 420. Here each cell in CellSet(1) sends its beam pilots, collects CQI from its users (only its users) with respect to such pilots, and decides which users to schedule and which beams and powers to assign to such users. Each cell may have a fixed preset set of beams $b_1, \ldots, b_m$ to consider. The definition of such beams could also be random, or be a random selection, from transmission slot to transmission slot. During this process users in CellSet(2) and CellSet(3) can sense the beam pilots from (some) cells in CellSet(1).

In the pilot, scheduling and beam selection process the base stations in CellSet(1) operate independently of each other and of all other cells in CellSet(k), k≥2. Referring to FIG. 3, and assuming for this time/frequency instance CellSet(1)=CellSet(A), this means Cells A(1), A(2), A(3) and A(4) operate independently from each other and do not send or share information to each other. They also operate independently of all "B" and "C" cells. If UT(a) is assigned beam "k" and a power $p_k$, the effective signal to interference ratio the UT(a) would see has form $$SINR(k, a) = \frac{p_k|(b_k, h_a)|^2}{1 + \sum_{j \neq k} p_j|(b_j, h_a)|^2}$$

This ratio can be calculated at the base-station given the CQI feedback from users in the cell. In one embodiment, if some CQI terms are not fed back (e.g. deemed too small by the UT), they are either set to zero or some small value. In another embodiment the user does not send back individual CQI terms, but only sends back the SINR.

The rate with which a user can be served can be a function of these SINR values. Thus, a cell, having such SINR values, through CQI terms, can make decisions on which users to schedule, which beams to assign to which users, etc. Such multi-user scheduling processes are known to those familiar with the state of the art. The invention uses such scheduling processes.

Referring back to FIG. 4, information gained through beam selection and scheduling of CellSet(1) is exchanged with base stations in other cell sets, 430. In one embodiment, once users and beams have been scheduled the identity of such beams and users may be sent to cells in CellSet(2). For illustration we consider this CellSet(2) to be the "B" cells in FIG. 3. In one embodiment, the actual beam coefficients do not need to be sent, only pilots. If the beams have different power levels than represented in the beam-pilots, beam-pilots are adjusted to reflect such power levels.

In one embodiment, each "A" cell sends information to only some "B" cells. For example, Cell A(1) sends information only to B-cells that it may receive (some minimal level of) interference from. In FIG. 3, for example, we one can consider that A(1)=300*a* sends information only to adjacent B cells, i.e. to B(1)=310*a* and B(2)=310*b*. Similarly, A(2)=300*b* sends to B(1)=310*a*, and so on. With this B(1) would receive information from A(1), A(2), and A(3).

Referring back to FIG. 4, information received from CellSet(1) can be used for beam selection and scheduling for CellSet(2). In one embodiment, beam selection mechanism for CellSet(2) is different than beam selection for CellSet(1). The different beam selection mechanism may function to enable cells in CellSet(2) to adjust beams in order to reduce interference to users scheduled in cells of CellSet(1). Cells in CellSet(2) operate independently of each other. Referring to the example of FIG. 3, this means Cells B(1), B(2), B(3) and B(4) operate independently from each other and do not send or share information to each other.

In one embodiment, for a given B-Cell, say B(1)=310*a* for illustration (all B-cells follow a similar procedure with respect to its considered A-cells), the system may create beams or select beams to as to minimize interference to the users it knows that are scheduled in A(1)=300*a* A(2)=300*b*, and A(3)=300*c*. It may not consider A(4)=300*d* given geographic separation. In such embodiments A(4) would not be required to send any information to B(1). Let their be "P" users in A(1), A(2), and A(3) that are scheduled, and the station in B(1) is made aware of, and let them be labeled UTA($x_1$), ..., UTA($x_P$).

In one embodiment, a cell's base station, e.g. the station in B(1)=310*a*, sends a number of channel-pilots and obtains Channel State Information (CSI) from those scheduled users in the relevant A-cells, e.g. in cells A(1)=300*a*, A(2)=300*b* and A(3)=300*c*. Note, B-cell B(2)=310*b* may also require CSI information from some of those same users, specifically scheduled users in A(1)=300*a*. This information is with respect to a different channel $h_j^n$ as mentioned before, where "n" identifies the base-station (or cell). Pilots in different B-cells can be made to operate orthogonally and/or in some predetermined fashion in time and frequency so as not to interfere with each other.

Once the base station of B(1) obtains the required CSI information between UTA($x_1$), ..., UTA($x_P$) and its transmit antennas, the base station may create or select (from a pool) a set of beams to minimize interference to such users. In one embodiment, the CSI, the channel, between UT($x_i$) and the base-station of B(1) is designated as $z_i$. Note, $z_i$ is a complex M-vector as $h_j$, of form $$z_j = (z_{1j}, z_{2j}, \ldots, z_{Mj})^T$$

In one embodiment the beams are created based on this information. A process to do so is to form a matrix $$Z = [z_1 z_2 \ldots z_P]$$

and create a symmetric matrix $$ZZ^*$$

This matrix has real valued eigenvalues. If the "m" beams for Cell B(1) are selected as the "m" eigenvectors corresponding the "m" eigenvalues with minimum absolute value, then these unit norm beams would be the selection that would minimize the sum interference to UTA($x_1$), ..., UTA($x_P$). If M>P, some eigenvalues would be zero and therefore some of the beams can be selected to as to ensure they create effectively zero interference to these users.

In another embodiment a B cell creates more beams than it will eventually schedule. Specifically, the cell can consider "L", L>m, beams, and allow the base station of cell B(1) to also do some internal beam selection with respect to its users, and in the process described above, in order to finally select a subset of m beams that is good with respect to both its cell and neighboring A cells.

Another selection is simply to not to create beams but rather to select beams. Beams can be selected as a subset of beams from a pool (also known as a codebook) of pre-designed beams. The selection is made so as to minimize the sum interference to UTA($x_1$), ..., UTA($x_P$). Another selection is simply to select a subset of beams from a pool of pre-designed so as to minimize the maximum interference to any of the UTA($x_1$), ..., UTA($x_P$).

Another method of beam selection is to use only CQI. This procedure may be included within the User Selection in CellSet(2) procedure described below. Here the base station of the B-cell has a pre-determined pool of beams. The base station sends beam pilots, and then obtains CQI information both from its users (as in the intra-cell procedure) and also from UTA($x_1$), ..., UTA($x_P$). The CQI from UTA($x_1$), ..., UTA($x_P$) informs the B-cell base station as to the interference it will create to such users for a given beam selection. The base station then constrains its user and beam selection so as to select beams that do not interfere beyond a certain level to UTA($x_1$), ..., UTA($x_P$).

Beam selection and scheduling is performed for CellSet (2), 440. In one embodiment, user selection in each cell in CellSet(2) is done as described above, given the beam as selected in the steps above (one of the two options). There is however one extra process to consider which is in addition to the process for CellSet(1) which may be used to improve performance to B-Cell users. This process uses signaling already performed in the user and beam selection for A-cells.

In one embodiment, when A-cells signaled its own users with its beams, B-cell users in range of any such transmission were able to obtain CQI with respect to all such beams. B-cell users in a given B-cell, e.g. B(1), may receive CQI information with respect to beams in the A-cells near to it, e.g. A(1), A(2) and A(3). As with the channel-pilots, beam pilots from different A-cells can be made to operate over time and frequency so as not to interfere with each other.

When beam pilots in B(1) are sent to its users, the identity of the scheduled beams in A(1), A(2) and A(3) may also be sent. In one embodiment, when B(1) users send CQI information of B(1) beams back to the base-station of B(1), they also send CQI information for these (and only for these) scheduled A-Cell beams. This extra CQI may be used to revise the interference level calculation for B(1) users.

For example, if the A cell beams have energy $abeamp_1, \ldots, abeamp_P$, the beams are $beamp_1, beamp_P$, and these beams are seen by a user $UT(l_k)$ in B(1) where $beamp_1$ comes through a channel $h_{tk}$ to the user from the A-cell antennas, the true interference a such a user sees comes from both beams within its cells and beams in adjacent cells.

$$\text{New Interference Energy} = \sum_{j \neq k} p_j |(b_j, h_{l_k})|^2 + \sum_t abeamp_t |(abeam_t, h_{t_k})|^2$$

This sum "New Interference Energy" value is a form of CQI which is sufficient to define quantities such as "Q" in rate determinations by the station in B(1). Users may only send back such information. Knowing users possible rates B(1) can make its scheduling and beam decisions.

Furthermore, C-cells in Subset(3) may also create interference to users in B(1), interference which is unknown at this point in the stepwise process since cells in Subset(3) have not made any decisions. In some embodiments allowing for some nominal level of such interference in the CQI can improve system performance. One way to do so is to add an additional term "$C(l_k)$" to account for this unknown interference, e.g. as in $$\text{New Interference2} = \sum_{j \neq k} p_j |(b_j, h_{l_k})|^2 + \sum_t abeamp_t |(abeam_t, h_{t_k})|^2 + C(l_k)$$

Either of these is used in the SINR calculation when scheduling B(1)'s users. Note, only the CQI value $|(abeam_r, h_{tk})|$ needs to be sent, and at times it is sufficient to send some of the sum quantities. The base station in cell B(1) does not need to know the individual channels.

In one embodiment, once users and beams have been scheduled the identity of such beams and users is sent to cells in CellSet(3), 450. In one embodiment, each "A" and "B" cell may send information to only some "C" cells. For example, Cells A(1) and B(1) may send information (either directly or by forwarding) only to C-cells that it may receive (some minimal level of) interference from. Because some B-cells may have A-cell information required by a C-cell, the B-cells may forward this information. That is, A-cells do not have to send this information directly.

In one embodiment, the base station in cell B(1)=310a sends information only to C(1)=320a, C(2)=320b and C(3)=320c. Similarly, B(2) sends to C(1), and so on. C(1) requires information from A(1), A(2) and A(4). Note, B(1) already has the information about A(1), and so forwards this information, along with its own, to C(1).

The base stations on CellSet(2) send information to other cells, 450. Similar to what was done in CellSet(2), beams in each cell in CellSet(3) are chosen so as not to interfere (either in a sum, maximum and/or other sense) to users in CellSet(1) and CellSet(2). The procedure is similar to that described above for CellSet(2), except that the users "$UTA(x_1), \ldots, UTA(x_P)$" come from both A-cell and B-cells. Once the beams are designed/selected, each C-cell base station operates independently to select its users.

Beam selection and scheduling is performed for CellSet (3), 460. The beam selection and scheduling is performed in a similar manner as for CellSet(2) described above, but utilizing information available to the base stations in CellSet(3), i.e. using information form various cells in CellSet(1) and CellSet(2). The example of FIGS. 3 and 4 describe only three subsets of cells; however, any number of subsets can be supported. If additional subsets are supported, information is exchanged with these additional cells as described above.

Note, when transmission actually occurs, 460, at the end of the complete scheduling and decision process, an A-cell user may receive interference form B and C cells (and possibly from A-cells, though the system ignores these as being small). In one embodiment these unknown interference levels can be accounted for in 420 by adding a term to the inter-cell interference similar to what was done in 440 and 460 above. For example, assume the signal $s_k$ on beam $b_k$ is intended for a scheduled the $i_k$-th user terminal, $UT(i_k)$, in an A-cell. We will ignore for simplicity of exposition the index "n" for such a cell in beam, power and CSI quantities. Also assume that the total B-cell+C-cell to the A-cell interference this user expects to receive is $BC(i_k)$, Then one can replace the interference energy in the SINR calculation by the below quantity.

$$\text{New Interference Energy} = \sum_{j \neq k} p_j |(b_j, h_{i_k})|^2 + BC(i_k)$$

Once all of the subsets of cells are configured, transmission can occur in all cells, 470. Transmission from the "M" antennas in each cell to UTs in the cell is made by applying as previously described data signals to respective beams. creating a number of beams As mentioned above, once a set of potentially scheduled beams, $b_1, \ldots, b_L$ has been chosen or selected at random by a station, the base-station in the cell transmits each beam as a pilot to the users at a nominal power "$q_k$". This "q" can be determined by a power level "$p_k$", which may at the point of sending the pilot be determined or still yet undetermined. Each user, on receiving the beam pilots calculates an estimate for the CQIs with respect to the beams. For UT(a) this is the set $$CQI(j,a) = q_j |(b_j, h_a)|^2 \ j=1, \ldots, L$$

If the power "$q_k$" is a nominal level, the base-station, knowing or making the final decision on "$p_k$" values can adjust such CQI terms accordingly without having to send additional pilots. In some steps of scheduling such powers "$q_k$" may be set to some (equal) nominal power "β", from which adjustments to CQI for actual values "$p_k$" can be made simply by the ratio "$p_k/β$".

Users feedback CQI information to various base-stations in the multi-step process outlined above. In some embodiments the UT(a) sends back all such individual $q_j |(b_j, h_a)|^2$ like terms of such information. In some embodiments each UT may choose to ignore some of the terms (beams) if the signal level is sufficiently small so as to either be negligible in terms of potential interference or insufficient to support a users data stream.

As mentioned before, CQI is obtained for other base-stations, where an index "n" refines the identity of beam, power, channel and CQI quantities with respect to a base-station identity "n". For beams a user knows it can not use (or will not be assigned to use) to support its own signaling stream, such beams are potential forms of interference to the user. If the user knows such beams are being scheduled, e.g. if such beams are from cells of higher priority than its own cell, and thus will become interference, it may be sufficient in some embodiments that the user not send the individual CQI values but a sum over many such CQI values, as shown in sum "Interference" quantities.

If UT(a) is assigned beam "k" and a power $p_k$, the effective signal to interference ratio the UT(a) would see has form $$SINR(k,a) = \frac{p_k q |(b_k, h_a)|^2}{q + q \sum_{j \neq k} p_j |(b_j, h_a)|^2}$$

As mentioned this ratio can be calculated at the base-station given the CQI feedback from users in the cell. Such SINR estimates may also be calculated by the user itself. In some embodiments the user calculates this SINR value and sends this to the base-station. In some embodiments, if the SINR value is too low, the user may choose not to send any such information to the base-station.

The supported rate UT(a) can receive can be determined as function of SINR values for this user. The SINR is in fact the term, or strongly related to the term, "S/Q" mentioned in the background section. Here for example, Supported Rate$(k,a)$=Function$(SINR(k,a))$ For example, one such function in terms of bits/sec/Hz could have a form Supported Rate$(k,a)$=$\log_2(1+SINR(k,a))$−offset$(SINR(k,a))$ In one embodiment, the offset term is used to convert an ideal achievable rate to a practical rate. In general, each SINR value is mapped, either by a function, or a lookup table, to a supported rate.

In one embodiment, at any given transmission slot, a selection of users, $UT(i_1), \ldots, UT(i_m)$ is made to be served by beams. If L=m, i.e. all beams are to be used, and $UT(i_j)$ is given beam $b_j$, selection can be done to maximize $$\text{Proportional Fair Rate} = \sum_{j=1}^{m} w(i_j) \text{ Supported Rate } (j, i_j)$$

This selection is in line with a classic proportional fair sharing (PFS) system, known to those skilled in the art. The weight "w(a)" assigned to UT(a) to ensure the desired fairness between users seeing different average channel conditions.

If m<L subset of beams is to be selected in addition to a subset of users. Consider that beam $c_j$ is assigned to $UT(i_j)$, then both a subset of beam indices $c_1, \ldots, c_m$ and a set of users $UT(i_1), \ldots, UT(i_m)$, is selected to maximize $$\text{Proportional Fair Rate} = \sum_{j=1}^{m} w(i_j) \text{ Supported Rate } (c_j, i_j)$$

In one embodiment, the search over beam indices and user indices in each cell is in general a combinatorial process. This can be complex for moderate numbers of users and/or moderate numbers of beams. However, one process that works well is to limit the search to considering only one beam for each UT. To do this over the K users, UT(a), a=1, . . . , K, for each UT(a) one beam from the L beams is selected. Label the index of this beam $r_a$. The selection of UT(a) in scheduling implies that this beam will be used for this user. This system makes sense since it is often the case that only a single beam provides a good signal term to a user.

A nominal power β is assumed for the beam. Given this UT(a) has a nominal supported rate based on this beam and power as described before. The users are then selected in a greedy fashion whereby at step "n" $UT(i_n)$ is selected so that maximizes the partial sum $$\sum_{j=1}^{n} w(i_j) \text{ Supported Rate } (r_j, i_j)$$

given the previous selections $i_1, \ldots, i_{n-1}$, and under the restriction that this n-th (new) user does not use the same beam as any of the other previously selected users $UT(i_1), \ldots, UT(i_{n-1})$.

In one embodiment, the greedy algorithm starts by selecting the first user, and continues till all "m" users are selected. This provides a fast, efficient, method for making a good joint beam and user selection. The process can be extended to N>3 subsets, with cells in CellSet(k) sending its own information and forwarded user ID and beam ID information from CellSet (1), . . . , CellSet(k−1) to cells in CellSet(k+1).

In addition to reducing overheads via the cell subsets, the type of inter-cell communication also greatly helps to simplify the system. The inter-cell information shared between cells as described is in two forms. The first is that which is sent directly between cells, say from a "Cell(i) in CellSet(k)" to a "Cell(j) in Cellset(k+1)", via the existing "backbone" communication link between cells (or between base-stations in different cells). This information includes which users (the user identifications) of the users scheduled for transmission in "Cell(i)", and possibly also, if there is also a choice of beams, which beam (beam indices) are to be scheduled and at which power. This is a small amount of information relative to channel state information and beamforming coefficients, both of which are vectors of complex valued terms.

The second type of information that is exchanged (from Cell(i) to Cell(j)) is implicit information received indirectly from beams or channel pilots sent from base-stations/antennas in "Cell(i)". Specifically, when "Cell(i)" send pilot beams, pilots which are used to get Channel Quality Information (CQI) from its own users, users in Cell(j) note also the channel quality with respect to those beams. Channel quality information, for the beams scheduled in Cell(i), are sent to the base-station of Cell(j) when Cell(j) gets feedback from its own users with respect to its own beams.

If Cell(i) did beam selection, the CQI feedback required with respect to Cell(i) beams is only for the scheduled beams in Cell(i). Finally, since Cell(j) knows the users scheduled in Cell(i), it requests also, when it sends channel pilots, such users to send Channel State Information (CSI) and/or CQI feedback to the Cell(j) base-station. Only scheduled users in Cell(i), which can sufficiently sense such pilots (are in interference/transmission range Cell(j)), need to send such feedback. Users which are not scheduled in Cell(i), or see signals from the base-station in Cell(j) are low levels, will not or implicitly can not respond with such information.

Figure 5:
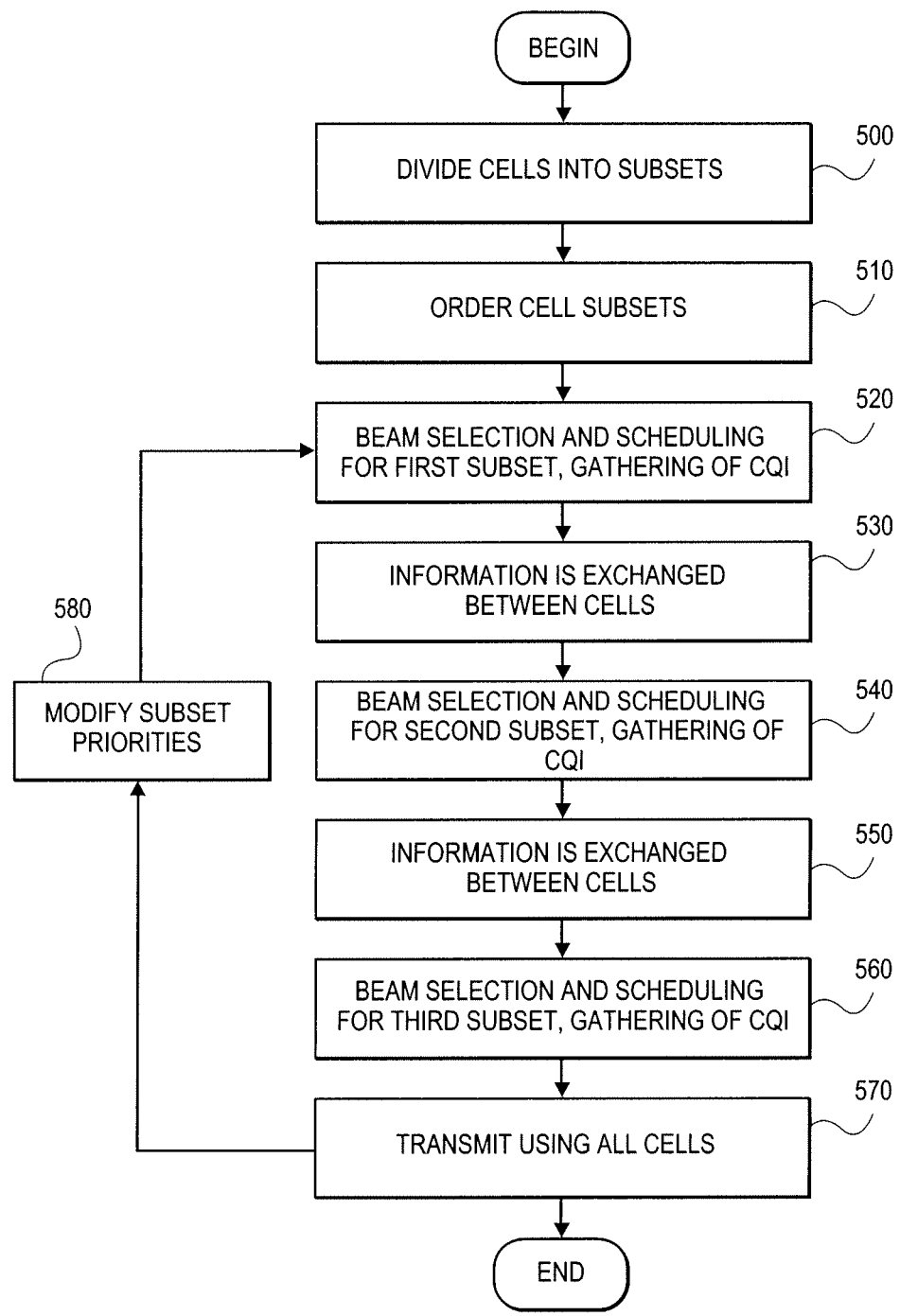
FIG. 5 is a flow diagram of one embodiment of a technique for operating a cell-based wireless network where subset priorities are dynamically modified.

FIG. 5 is a flow diagram of one embodiment of a technique for operating a cell-based wireless network where subset priorities are dynamically modified. The technique of FIG. 5 may be applied to groups of cells as described above.

The multiple cells are divided into multiple subsets, 510. The description of FIG. 5 is based on the cell arrangement illustrated in FIG. 3; however, different cell arrangements in terms of, for example, numbers of cells and/or numbers of subsets, can also be supported.

The cell subsets are ordered, 510. Subset ordering may be pre-programmed into the base stations and/or ordering may be accomplished by operation of an external controller that can communicate with the base stations.

Beam selection and scheduling is performed for the first subset, 520. In one embodiment, the scheduling is performed by the base stations in the cells of the first subset. Each cell may have a fixed preset set of beams $b_1, \ldots, b_n$. to consider. The definition of such beams could also be random, or be a random selection, from transmission slot to transmission slot.

Information gained through beam selection and scheduling of CellSet(1) is exchanged with base stations in other cell sets, 530. In one embodiment, once users and beams have been scheduled the identity of such beams and users may be sent to cells in CellSet(2). For illustration we consider this CellSet(2) to be the "B" cells in FIG. 3. In one embodiment, the beam coefficients do not need to be sent, only pilots. If the beams have different power levels than represented in the beam-pilots, beam-pilots are adjusted to reflect such power levels. In one embodiment, each "A" cell sends information to only some "B" cells. For example, Cell A(1) sends information only to B-cells that it may receive (some minimal level of) interference from.

Beam selection and scheduling is performed for CellSet (2), 540. In one embodiment, user selection in each cell in CellSet(2) is done as described above, given the beam as selected in the steps above.

In one embodiment, once users and beams have been scheduled the identity of such beams and users is sent to cells in CellSet(3), 550. In one embodiment, each "A" and "B" cell may send information to only some "C" cells. For example, Cell A(1) and B(1) may send information only to C-cells that it may receive (some minimal level of) interference from. Because some B-cells may have A-cell information required by a C-cell, the B-cells may forward this information.

Beam selection and scheduling is performed for CellSet (3), 560. The beam selection and scheduling is performed in a similar manner as for CellSet(2) described above, but utilizing information available to the base stations in CellSet(3). The example of FIGS. 3 and 5 describe only three subsets of cells; however, any number of subsets can be supported. If additional subsets are supported, information is exchanged with these additional cells as described above.

Once all of the subsets of cells are configured, transmission can occur in all cells, 570. In one embodiment, after the subsets of cells are configured, the priorities of the subsets may be modified, 580. That is, the subset groups may be reorganized with one or more of the cells being assigned a different priority than during the previous initialization sequence.

In response to the modification of the priorities, 580, a subsequent initialization sequence may be performed. In this subsequent initialization sequence the highest priority group of cells operates as described above and provides information to the next highest priority group of cells. The process continues as outlined above until all cells are initialized.

Figure 6:
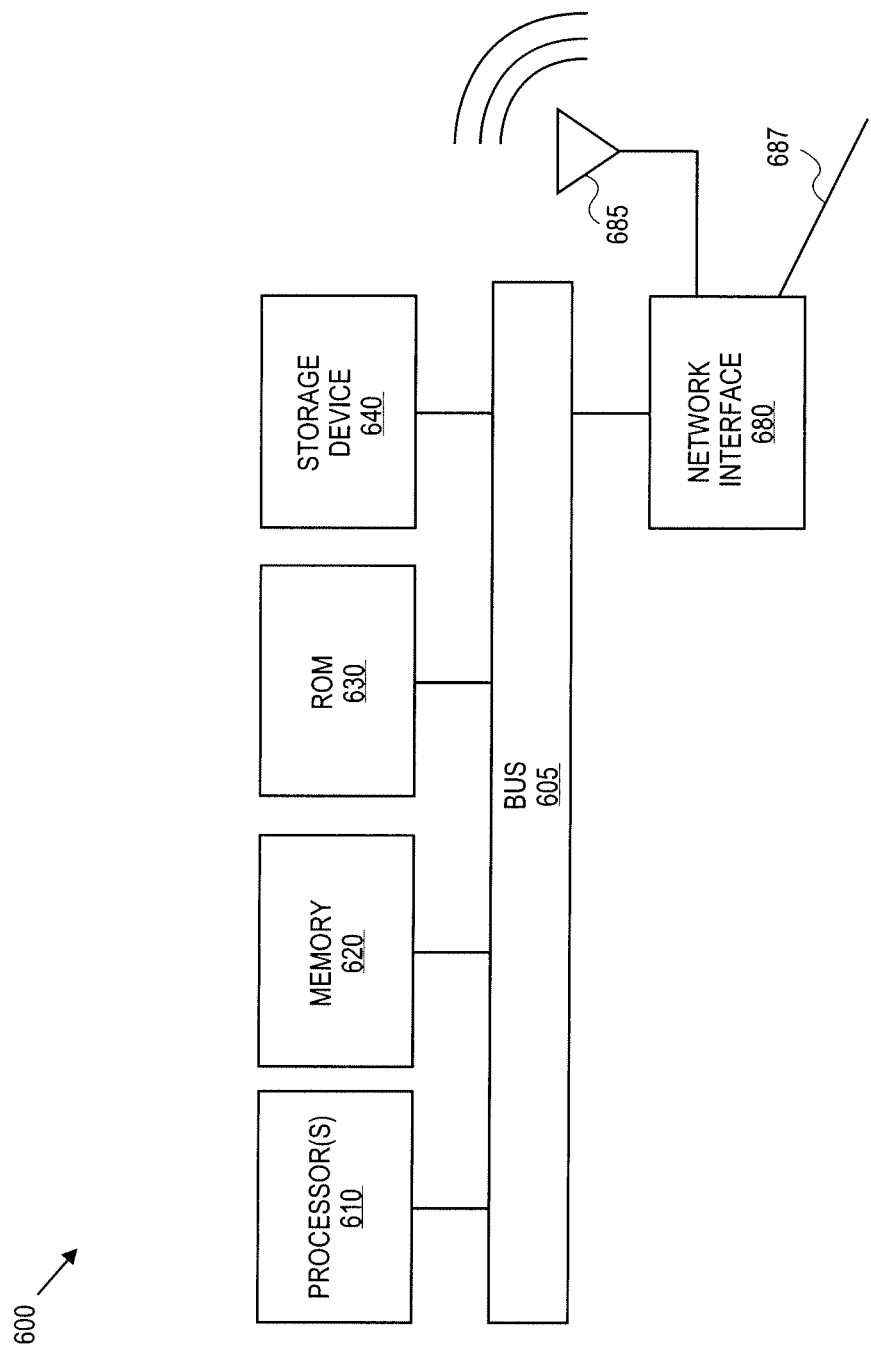
FIG. 6 is a block diagram of one embodiment of a base station.

FIG. 6 is a block diagram of one embodiment of a base station. The base station illustrated in FIG. 6 is intended to represent a range of base stations (e.g., for a macrocell, for a picocell). Alternative base stations may include more, fewer and/or different components. A mobile wireless device including, for example, for cellular telephones, wireless data communications, etc., may have the same or a similar architecture.

Base station 600 may include bus 605 or other communication device to communicate information, and processor 610 coupled to bus 605 that may process information. While base station 600 is illustrated with a single processor, base station 600 may include multiple processors and/or co-processors. Base station 600 further may include random access memory (RAM) or other dynamic storage device 620, coupled to bus 605 and may store information and instructions that may be executed by processor 610. For example, the process of FIG. 6 may be implemented as instructions stored in memory 620 that are executed by processor 610. Memory 620 may also be used to store temporary variables or other intermediate information during execution of instructions by processor 610.

Base station 600 may also include read only memory (ROM) and/or other static storage device 630 coupled to bus 605 that may store static information and instructions for processor 610. Data storage device 640 may be coupled to bus 605 to store information and instructions. Data storage device 640 such as a magnetic disk or optical disc and corresponding drive may be coupled to base station 600.

Base station 600 further may include network interface(s) 680 to provide access to a network. Network interface(s) 680 may include, for example, a wireless network interface having antenna 685, which may represent one or more antenna(e) that may communicate utilizing OFDM protocols. Network interface(s) 680 may also include, for example, a wired network interface to communicate with remote devices via network cable 687, which may be, for example, an Ethernet cable, a coaxial cable, a fiber optic cable, a serial cable, or a parallel cable.

A computer-readable medium includes any mechanism that provides (e.g., memory 620, ROM 630, storage device 640) content (e.g., computer executable instructions) in a form readable by an electronic device (e.g., a computer, a personal digital assistant, a cellular telephone). For example, a computer-readable medium includes read only memory (ROM); random access memory (RAM); magnetic disk storage media; optical storage media; flash memory devices, etc.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method of operating a multiple-cell network, each cell having at least one wireless transmission entity, the method comprising:

dividing multiple cells into a plurality of subsets of cells, each subset having one or more cells, the plurality of subsets of cells having an associated priority, the priority of which is changed over transmission resources;

causing cells of a subset to operate transmission processes independent of each other without requiring exchange of information between the cells of the same subset;

causing cells of lower priority to utilize transmissions by cells of higher priority and transmission parameters from cells of higher priority in determining their own transmission parameters;

performing scheduling and transmission parameter operations for each cell starting with a highest priority subset of cells, and ending with a lowest priority subset of cells;

forwarding scheduling and transmission parameter information from each of the transmission entities in the subset of cells having a higher priority to selected transmission entities in a subset of cells having a lower priority, and further comprising:

selecting beamforming vectors by sending beam pilots from transmission entities in the subset of cells having a second highest priority, wherein the beamforming vectors and associated beam pilots in each such cell are selected in part to limit interference to user terminal in at least some of the highest priority cells based on scheduling and transmission parameter information received form cells having the highest priority;

performing scheduling decisions and transmission parameter decisions, wherein the scheduling decisions and transmission parameter decisions include selecting for each of the second priority cells, at least one of the following: (i) beamforming vectors to send data on, (ii) rate allocations to users, and (iii) power on each of the beamforming vectors;

wherein the second priority cells operate such processes independent from processes other second priority cells.

2. A method of operating a multiple-cell network, each cell having at least one wireless transmission entity, the method comprising:

dividing multiple cells into a plurality of subsets of cells, each subset having one or more cells, the plurality of subsets of cells having an associated priority, the priority of which is changed over transmission resources;

causing cells of a subset to operate transmission processes independent of each other without requiring exchange of information between the cells of the same subset;

causing cells of lower priority to utilize transmissions by cells of higher priority and transmission parameters from cells of higher priority in determining their own transmission parameters;

performing scheduling and transmission parameter operations for each cell starting with a highest priority subset of cells, and ending with a lowest priority subset of cells, wherein performing scheduling operations comprises sending pilot signals, obtaining channel information with respect to user terminal within a corresponding cell, and performing beam selection and scheduling independently of other cells having the same priority, wherein the beam selection and scheduling correspond to transmissions to serve the user terminal within the corresponding cell;

forwarding scheduling and transmission parameter information from each of the transmission entities in the subset of cells having a higher priority to selected transmission entities in a subset of cells having a lower priority.

3. The method of claim 2 further comprising:

scheduling transmissions to one or more user terminals in the subset of cells having the highest priority by each base station in the subset of cells having the highest priority based, at least in part, on channel state related information, wherein the scheduling is performed by each base station independently of other cells in the subset of cells having the highest priority; and selecting a transmission solution, wherein the transmission solution includes selecting at least one of the following: (i) beamforming vectors to send data on, (ii) rate allocations to users, and (iii) power on each of the beamforming vectors;

wherein the selection is in the subset of cells having the highest priority by each base station in the subset of cells having the highest priority based, at least in part, on the channel state related information; and wherein the selection is performed by each base station independently of other cells in the subset of cells having the highest priority.

4. The method of claim 2 wherein obtaining the channel information comprises receiving channel quality information based on one or more pilot beams received by a respective user terminal.

5. A method of operating a multiple-cell network, each cell having at least one wireless transmission entity, the method comprising:

dividing multiple cells into a plurality of subsets of cells, each subset having one or more cells, the plurality of subsets of cells having an associated priority, the priority of which is changed over transmission resources;

causing cells of a subset to operate transmission processes independent of each other without requiring exchange of information between the cells of the same subset;

causing cells of lower priority to utilize transmissions by cells of higher priority and transmission parameters from cells of higher priority in determining their own transmission parameters;

performing scheduling and transmission parameter operations for each cell starting with a highest priority subset of cells, and ending with a lowest priority subset of cells;

forwarding scheduling and transmission parameter information from each of the transmission entities in the subset of cells having a higher priority to selected transmission entities in a subset of cells having a lower priority, and further comprising:

scheduling transmissions to one or more user terminal in the subset of cells having a second highest priority by each base station in the subset of cells having the second highest priority based, at least in part, on the channel information related to cells in the highest priority subset, wherein the scheduling is performed by each base station independently of other cells in the subset of cells having the second highest priority; and selecting a transmission solution, wherein the transmission solution includes selecting at least one of the following: (i) beamforming vectors to send data on, (ii) rate allocations to users, and (iii) power on each of the beamforming vectors;

wherein the selection is in the subset of cells having the second highest priority by each base station in the subset of cells having the second highest priority based, at least in part, on the channel information; and wherein the selection is performed by each base station independent of other cells in the subset of cells having the second highest priority.

6. The method of claim 5 further comprising selecting and sending beam pilots from base stations in the subset of cells having a third highest priority, wherein beams are selected to limit interference to selected user terminals in cells of higher priority subsets based on user information received form cells having the first and second highest priority.

7. A method of operating a multiple-cell network, each cell having at least one wireless transmission entity, the method comprising:
dividing multiple cells into a plurality of subsets of cells, each subset having one or more cells, the plurality of subsets of cells having an associated priority, the priority of which is changed over transmission resources;
causing cells of a subset to operate transmission processes independent of each other without requiring exchange of information between the cells of the same subset;
causing cells of lower priority to utilize transmissions by cells of higher priority and transmission parameters from cells of higher priority in determining their own transmission parameters;
performing scheduling and transmission parameter operations for each cell starting with a highest priority subset of cells, and ending with a lowest priority subset of cells;
forwarding scheduling and transmission parameter information from each of the transmission entities in the subset of cells having a higher priority to selected transmission entities in a subset of cells having a lower priority, wherein forwarding scheduling and transmission parameter information from the base stations in the subset of cells having the highest priority to base stations in a subset of cells having a second highest priority comprises each base station in the subset of cells having the highest priority forwarding to a selected subgroup of the subset of cells having a second highest priority, one or more of the following including user terminal identification information corresponding to user terminals operating within the subset of cells having the highest priority, beam information corresponding to beams transmitted by the base stations in the subset of cells having the highest priority, and channel information of some user terminals in the subset of cells having the highest priority.

8. A wireless communication system comprising:
a first plurality of cells, each having at least one base station and an associated first priority, the base stations in the first plurality of cells to operate independently of each other, to send pilot signals, to obtain channel information from one or more user terminal that receive the pilot signals and to forward user and beam information to one or more base stations having a lower priority, wherein the channel information comprises receiving channel quality information based on one or more pilot beams received by a respective user terminal; and
a second plurality of cells, each having at least one base station and an associated second priority, each the base stations in the second plurality of cells to select transmissions in order to limit interference to a subset of cells in a highest priority set, where selection is based on user terminal information, beam and channel information received form a subset of base stations in the first plurality of cells.

9. A wireless communication system comprising:
a first plurality of cells, each having at least one base station and an associated first priority, the base stations in the first plurality of cells able to operate independently of each other, to send pilot signals, to obtain channel information from one or more user terminal that receive the pilot signals and to forward user and beam information to one or more base stations having a lower priority; and
a second plurality of cells, each having at least one base station and an associated second priority, each the base stations in the second plurality of cells to select transmissions in order to limit interference to a subset of cells in the highest priority set, where selection is based on user terminal information, beam and channel information received form a subset of base stations in the first plurality of cells, and further wherein the second plurality of cells obtain channel information from one or more user terminal that receive the beam pilots from base stations second plurality of cells and to forward user and beam information to base stations in a third plurality of cells.

10. The wireless communication system of claim 9 wherein the base stations in the second plurality of cells further to schedule transmissions to the one or more user terminal in the second plurality of cells based, at least in part, on the channel information, wherein the scheduling is performed by each base station independently of other base stations in the second plurality of cells, and to select beamforming solutions based, at least in part, on the channel information from cells in the highest priority, wherein the scheduling and beam selection is performed by each base station independently of other base stations in the second plurality of cells.

11. A wireless communication system comprising:
a first plurality of cells, each having at least one base station and an associated first priority, the base stations in the first plurality of cells to operate independently of each other, to send pilot signals, to obtain channel information from one or more user terminal that receive the pilot signals and to forward user and beam information to one or more base stations having a lower priority; and
a second plurality of cells, each having at least one base station and an associated second priority, each the base stations in the second plurality of cells to select transmissions in order to limit interference to a subset of cells in the highest priority set, where selection is based on user terminal information, beam and channel information received form a subset of base stations in the first plurality of cells; and
wherein the base stations in the first plurality of cells schedule transmissions to the one or more user terminal in the first plurality of cells based, at least in part, on the channel information, wherein the scheduling is performed by each base station independently of other base stations in the first plurality of cells, and to select beamforming solutions based, at least in part, on the channel information, wherein the scheduling is performed by each base station independently of other base stations in the first plurality of cells.

12. An article of manufacture comprising a non-transitory computer readable medium having stored thereon instructions to implement operation of a multiple-cell network, each cell having at least one base station, the instructions, when executed, to cause one or more processors to:
divide multiple cells into a plurality of subsets of cells, each subset having one or more cells, the plurality of subsets of cells having an associated priority, the priority of which is changed over transmission resources;
cause cells of a subset to operate transmission processes independent of each other without requiring exchange of information between the cells of the same subset;
cause cells of lower priority to utilize transmissions by cells of higher priority and transmission parameters from cells of higher priority in determining their own transmission parameters;

perform scheduling and transmission parameter operations starting with a highest priority subset of cells, and ending with a lowest priority subset of cells;

forward scheduling and transmission parameter information from each of the base stations in the subset of cells having a higher priority to selected base stations in a subset of cells having a lower priority;

send beam pilots from base stations in the subset of cells having a second highest priority, wherein beams and associated beam pilots in each such cell are selected in part to limit interference to a user terminal in at least some of the highest priority cells based on scheduling and transmission parameter information received form cells having the highest priority; and perform scheduling and transmission parameter decisions in each of the second priority cells where such cells are to operate such processes independent of those of other second priority cells.

13. An article of manufacture comprising a non-transitory computer readable medium having stored thereon instructions to implement operation of a multiple-cell network, each cell having at least one base station, the instructions, when executed, to cause one or more processors to:

divide multiple cells into a plurality of subsets of cells, each subset having one or more cells, the plurality of subsets of cells having an associated priority, the priority of which is changed over transmission resources;

cause cells of a subset to operate transmission processes independent of each other without requiring exchange of information between the cells of the same subset;

cause cells of lower priority to utilize transmissions by cells of higher priority and transmission parameters from cells of higher priority in determining their own transmission parameters;

perform scheduling and transmission parameter operations starting with a highest priority subset of cells, and ending with a lowest priority subset of cells;

forward scheduling and transmission parameter information from each of the base stations in the subset of cells having a higher priority to selected base stations in a subset of cells having a lower priority, and further wherein the instructions that cause the one or more processors to perform scheduling operations comprise instructions that, when executed, cause the one or more processors to:

send pilot signals;

obtain channel information with respect to a user terminal within a corresponding cell; and perform beam selection and scheduling independently of other cells having a same priority, wherein beam selection and scheduling correspond to transmissions to serve the user terminal within the corresponding cell.

14. The article of claim 13 further comprising instructions that, when executed, cause the one or more processors to:

schedule transmissions to the one or more user terminals in the subset of cells having the highest priority by each base station in the subset of cells having the highest priority based, at least in part, on the channel state related information, wherein the scheduling is performed by each base station independently of other cells in the subset of cells having the highest priority; and select a transmission solutions in the subset of cells having the highest priority by each base station in the subset of cells having the highest priority based, at least in part, on the channel state related information, wherein the selection is performed by each base station independently of other cells in the subset of cells having the highest priority.

15. The article of claim 13 wherein obtaining channel information comprises receiving channel quality information based on one or more pilot beams received by a respective user terminal.

16. An article of manufacture comprising a non-transitory computer readable medium having stored thereon instructions to implement operation of a multiple-cell network, each cell having at least one base station, the instructions, when executed, to cause one or more processors to:

divide multiple cells into a plurality of subsets of cells, each subset having one or more cells, the plurality of subsets of cells having an associated priority, the priority of which is changed over transmission resources;

cause cells of a subset to operate transmission processes independent of each other without requiring exchange of information between the cells of the same subset;

cause cells of lower priority to utilize transmissions by cells of higher priority and transmission parameters from cells of higher priority in determining their own transmission parameters;

perform scheduling and transmission parameter operations starting with a highest priority subset of cells, and ending with a lowest priority subset of cells;

forward scheduling and transmission parameter information from each of the base stations in the subset of cells having a higher priority to selected base stations in a subset of cells having a lower priority, and wherein the instructions, when executed, cause the one or more processors to:

schedule transmissions to the one or more user terminal in the subset of cells having a second highest priority by each base station in the subset of cells having the second highest priority based, at least in part, on the channel information related to cells in the highest priority subset, wherein the scheduling is performed by each base station independently of other cells in the subset of cells having the second highest priority; and select a transmission solutions in the subset of cells having the second highest priority by each base station in the subset of cells having the second highest priority based, at least in part, on the channel information, wherein the selection is performed by each base station independently of other cells in the subset of cells having the second highest priority.

17. The article of claim 16 further comprising instructions that, when executed, cause the one or more processors to send beam pilots from base stations in the subset of cells having a third highest priority, wherein the beams are selected to limit interference to selected user terminals based on user information received form cells having the first and second highest priority.

18. An article of manufacture comprising a non-transitory computer readable medium having stored thereon instructions to implement operation of a multiple-cell network, each cell having at least one base station, the instructions, when executed, to cause one or more processors to:

divide multiple cells into a plurality of subsets of cells, each subset having one or more cells, the plurality of subsets of cells having an associated priority, the priority of which is changed over transmission resources;

cause cells of a subset to operate transmission processes independent of each other without requiring exchange of information between the cells of the same subset;

cause cells of lower priority to utilize transmissions by cells of higher priority and transmission parameters from cells of higher priority in determining their own transmission parameters;

perform scheduling and transmission parameter operations starting with a highest priority subset of cells, and ending with a lowest priority subset of cells;

forward scheduling and transmission parameter information from each of the base stations in the subset of cells having a higher priority to selected base stations in a subset of cells having a lower priority, wherein forwarding scheduling and transmission parameter information from the base stations in the subset of cells having the highest priority to base stations in a subset of cells having a second highest priority comprises each base station in the subset of cells having the highest priority forwarding to a selected subgroup of the subset of cells having the second highest priority, one or more of the following including user terminal identification information corresponding to user terminal operating within the subset of cells having the highest priority, beam information corresponding to beams transmitted by the base stations in the subset of cells having the highest priority, and channel information of some user terminals in the subset of cells having the highest priority.

19. An apparatus for operating a multiple-cell network, where each cell having at least one wireless transmission entity, the apparatus comprising:

a memory to store instructions; and a processor to execute the instructions, wherein the instructions when executed cause the apparatus to perform operations including:

dividing multiple cells into a plurality of subsets of cells, each subset having one or more cells, the plurality of subsets of cells having an associated priority, the priority of which is changed over transmission resources;

causing cells of a subset to operate transmission processes independent of each other without requiring exchange of information between the cells of the same subset;

causing cells of lower priority to utilize transmissions by cells of higher priority and transmission parameters from cells of higher priority in determining their own transmission parameters;

performing scheduling and transmission parameter operations starting with a highest priority subset of cells, and ending with a lowest priority subset of cells;

forwarding scheduling and transmission parameter information from each of the base stations in the subset of cells having a higher priority to selected base stations in a subset of cells having a lower priority, and the operations further comprising selecting beamforming vectors by sending beam pilots from base stations in the subset of cells having a second highest priority, wherein beams and associated beam pilots in each such cell are selected in part to limit interference to user terminal in at least some of the highest priority cells based on scheduling and transmission parameter information received form cells having the highest priority;

performing scheduling and transmission parameter decisions in each of the second priority cells where such cells operate such processes independent of those of other second priority cells.

20. An apparatus for operating a multiple-cell network, where each cell having at least one wireless transmission entity, the apparatus comprising:

a memory to store instructions; and a processor to execute the instructions, wherein the instructions when executed cause the apparatus to perform operations including:

dividing multiple cells into a plurality of subsets of cells, each subset having one or more cells, the plurality of subsets of cells having an associated priority, the priority of which is changed over transmission resources;

causing cells of a subset to operate transmission processes independent of each other without requiring exchange of information between the cells of the same subset;

causing cells of lower priority to utilize transmissions by cells of higher priority and transmission parameters from cells of higher priority in determining their own transmission parameters;

performing scheduling and transmission parameter operations starting with a highest priority subset of cells, and ending with a lowest priority subset of cells, wherein performing the scheduling operations; includes sending pilot signals, obtaining channel information with respect to user terminal within a corresponding cell, and performing beam selection and scheduling independently of other cells having the same priority, wherein the beam selection and scheduling correspond to transmissions to serve the user terminal within the corresponding cell; and forwarding scheduling and transmission parameter information from each of the base stations in the subset of cells having a higher priority to selected base stations in a subset of cells having a lower priority.

21. The apparatus of claim 20, wherein the operations further include:

scheduling transmissions to one or more user terminals in the subset of cells having the highest priority by each base station in the subset of cells having the highest priority based, at least in part, on the channel state related information, wherein the scheduling is performed by each base station independently of other cells in the subset of cells having the highest priority; and selecting a transmission solutions in the subset of cells having the highest priority by each base station in the subset of cells having the highest priority based, at least in part, on the channel state related information, wherein the selection is performed by each base station independently of other cells in the subset of cells having the highest priority.

22. An apparatus for operating a multiple-cell network, where each cell having at least one wireless transmission entity, the apparatus comprising:

a memory to store instructions; and a processor to execute the instructions, wherein the instructions when executed cause the apparatus to perform operations including:

dividing multiple cells into a plurality of subsets of cells, each subset having one or more cells, the plurality of subsets of cells having an associated priority, the priority of which can be changed over transmission resources;

causing cells of a subset to operate transmission processes independent of each other without requiring exchange of information between the cells of the same subset;

causing cells of lower priority to utilize transmissions by cells of higher priority and transmission parameters from cells of higher priority in determining their own transmission parameters;
performing scheduling and transmission parameter operations starting with a highest priority subset of cells, and ending with a lowest priority subset of cells;
forwarding scheduling and transmission parameter information from each of the base stations in the subset of cells having a higher priority to selected base stations in a subset of cells having a lower priority, and
the operations further comprising scheduling transmissions to one or more user terminal in the subset of cells having the second highest priority by each base station in the subset of cells having a second highest priority based, at least in part, on the channel information related to cells in the highest priority subset, wherein the scheduling is performed by each base station independently of other cells in the subset of cells having the second highest priority; and
selecting a transmission solutions in the subset of cells having the second highest priority by each base station in the subset of cells having the second highest priority based, at least in part, on the channel information, wherein the selection is performed by each base station independently of other cells in the subset of cells having the second highest priority.

* * * * *